(12) United States Patent
Sisto

(10) Patent No.: US 12,161,223 B2
(45) Date of Patent: Dec. 10, 2024

(54) WALL MOUNTING APPARATUS

(71) Applicant: Salto, LLC, Philadelphia, PA (US)

(72) Inventor: Salvatore Sisto, East Brunswick, NJ (US)

(73) Assignee: Salto, LLC

( * ) Notice: Subject to any disclaimer, the term of this patent is extended or adjusted under 35 U.S.C. 154(b) by 0 days.

(21) Appl. No.: 18/122,865

(22) Filed: Mar. 17, 2023

(65) Prior Publication Data

US 2023/0292920 A1    Sep. 21, 2023

Related U.S. Application Data

(60) Provisional application No. 63/396,304, filed on Aug. 9, 2022, provisional application No. 63/321,964, filed on Mar. 21, 2022.

(51) Int. Cl.
*A47B 96/02*  (2006.01)
*A47F 5/08*   (2006.01)
(Continued)

(52) U.S. Cl.
CPC .......... *A47B 96/028* (2013.01); *A47B 96/027* (2013.01); *A47F 5/08* (2013.01); *F16M 13/02* (2013.01); *A47B 57/18* (2013.01); *A47B 57/26* (2013.01); *A47B 57/44* (2013.01); *A47B 57/54* (2013.01); *A47B 2220/0041* (2013.01)

(58) Field of Classification Search
CPC .......... A47B 96/028; A47B 2220/0041; A47B 96/02; A47B 96/021; A47B 96/022; A47B 96/024; A47B 96/027; A47B 96/06; A47B 47/022; A47B 55/00; A47B 57/06; A47B 57/10; A47B 57/18; A47B 57/20; A47B 57/26; A47B 57/30; A47B 57/34;
(Continued)

(56) References Cited

U.S. PATENT DOCUMENTS 2,239,798 A  *  4/1941  Tinnerman ............ F24C 15/024
                                                       411/176
3,527,175 A  *  9/1970  Kapnek  .................... A47B 5/02
                                                       108/152

(Continued)

FOREIGN PATENT DOCUMENTS

EP          0455609 A1    11/1991
GB          2013080 A      8/1979

*Primary Examiner* — Devin K Barnett
(74) *Attorney, Agent, or Firm* — The Belles Group, P.C.

(57) ABSTRACT

A wall mounting apparatus and a method of manufacturing portions thereof. The wall mounting apparatus includes an article having a rear surface with at least one recess, a mounting component having a front surface with a mounting channel, a rear surface, and a peripheral surface, and a mounting bracket. The mounting component is positioned in the recess of the article with the rear surface of the mounting component facing the floor of the recess and bonded to the article with a bonding agent disposed between the peripheral surface of the mounting component and the sidewall of the recess of the article. The article is mounted to the wall via sliding engagement between the article and the mounting bracket while the mounting bracket is mounted to the wall and at least partially located within the mounting channel of the mounting component.

20 Claims, 26 Drawing Sheets

(51) Int. Cl.
*F16M 13/02* (2006.01)
*A47B 57/18* (2006.01)
*A47B 57/26* (2006.01)
*A47B 57/44* (2006.01)
*A47B 57/54* (2006.01)

(58) Field of Classification Search
CPC ......... A47B 57/44; A47B 57/48; A47B 57/54; A47F 5/08; F16M 13/02
See application file for complete search history.

(56) References Cited

U.S. PATENT DOCUMENTS

| | | | | |
|---|---|---|---|---|
| 3,704,675 A * | 12/1972 | Bellasalma | ........... | A47B 96/063 248/222.51 |
| 5,944,466 A * | 8/1999 | Rudnicki | ............ | F16B 13/0808 411/340 |
| 6,007,285 A * | 12/1999 | Sisto | ....................... | F16B 13/08 411/340 |
| 6,164,610 A | 12/2000 | Santiago | | |
| 6,591,762 B1 * | 7/2003 | Haghayegh | .......... | A47B 96/022 108/42 |
| 8,070,148 B2 * | 12/2011 | Nishida | ................. | A47J 47/005 269/302.1 |
| 8,430,252 B2 | 4/2013 | Susan | | |
| 8,684,195 B1 | 4/2014 | Caruso | | |
| D732,927 S | 6/2015 | Booth et al. | | |
| 9,163,415 B2 | 10/2015 | Nies | | |
| 9,456,692 B2 | 10/2016 | Tibbe et al. | | |
| D789,774 S | 6/2017 | Turk | | |
| 10,059,076 B2 * | 8/2018 | Torriani | .................... | B32B 3/08 |
| 10,575,641 B1 * | 3/2020 | Severa | ................. | A47B 96/061 |
| 10,602,843 B2 | 3/2020 | Sisto | | |
| 11,116,317 B2 * | 9/2021 | LeBlanc | ............... | A47B 96/067 |
| 11,857,075 B2 * | 1/2024 | Sisto | ....................... | F16B 7/042 |
| 2005/0109910 A1 | 5/2005 | Vander Berg et al. | | |
| 2006/0243688 A1 | 11/2006 | Gilcrest et al. | | |
| 2009/0224119 A1 * | 9/2009 | Heffernan | ............ | A47B 96/066 248/220.21 |
| 2014/0123468 A1 * | 5/2014 | Sisto | .................... | F16B 13/0808 411/21 |
| 2016/0095437 A1 * | 4/2016 | Crandall | ............ | A47B 96/021 211/90.01 |
| 2019/0053623 A1 * | 2/2019 | Sisto | ................... | F16B 5/0084 |
| 2019/0186686 A1 * | 6/2019 | Sisto | ................... | A47B 96/061 |
| 2020/0221871 A1 * | 7/2020 | Sisto | ................... | A47B 96/028 |
| 2021/0045531 A1 * | 2/2021 | Sisto | ................... | A47B 96/027 |
| 2022/0142390 A1 * | 5/2022 | Sisto | ....................... | A47H 1/142 |

\* cited by examiner

WALL MOUNTING APPARATUS

CROSS-REFERENCE TO RELATED APPLICATIONS

The present application claims the benefit of priority to U.S. Provisional Patent Application Ser. No. 63/321,964, filed Mar. 21, 2022, and U.S. Provisional Patent Application Ser. No. 63/396,304, filed Aug. 9, 2022, the entireties of which are incorporated herein by reference.

BACKGROUND

Shelves, ledges, and other wall-mountable articles are often hung within interior spaces to alter the décor of a room and to provide function in addition to the aesthetics. Floating shelves made out of wood or similar materials are made with holes on their rear surfaces for receiving posts protruding from wall-mounted brackets. As such, the wall-mounted brackets are hidden from the user's view behind and within the shelf. However, such techniques are not always effective for hanging shelves or ledges made from other materials, such as brittle materials. Moreover, such techniques may result in the shelf being mounted unevenly both in terms of the orientation of the support surface of the shelf and the flush engagement between the rear of the shelf and the wall. Thus, a need exists for a wall mounting apparatus and related methods that allow for shelves, ledges, and other wall-mountable articles, including those made from brittle materials, to be hung from a wall in a simple, effective, and robust manner.

BRIEF SUMMARY

The present invention is directed to a wall mounting apparatus and a method of manufacturing portions thereof. The wall mounting apparatus includes an article having a rear surface with at least one recess, a mounting component having a front surface with a mounting channel, a rear surface, a peripheral surface, and a flange protruding from the peripheral surface, and a mounting bracket. The mounting component is positioned in the recess of the article with the rear surface of the mounting component facing the floor of the recess and bonded to the article with a bonding agent disposed between the peripheral surface of the mounting component and the sidewall of the recess of the article. The article is mounted to the wall via sliding engagement between the article and the mounting bracket while the mounting bracket is mounted to the wall and at least partially located within the mounting channel of the mounting component.

In one aspect, the invention may be a wall mounting apparatus comprising: an article comprising a rear surface having at least one recess defined by a floor and a sidewall that extends from the floor to the rear surface; a mounting component comprising a front surface having a mounting channel, a rear surface, a peripheral surface extending between the front and rear surfaces, and a flange protruding from the peripheral surface; and a mounting bracket configured to be mounted to a wall; wherein the mounting component is positioned in the recess of the article with the rear surface of the mounting component facing the floor of the recess, and wherein the mounting component is bonded to the article with a bonding agent disposed between the peripheral surface of the mounting component and the sidewall of the recess of the article; and wherein the article is mounted to the wall via sliding engagement between the article and the mounting bracket while the mounting bracket is mounted to the wall and at least partially located within the mounting channel of the mounting component.

In another aspect, the invention may be a method of manufacturing a wall-mountable assembly that is configured to engage a mounting bracket that is mounted to a wall to mount the wall-mountable assembly to the wall, the method comprising: manufacturing an article comprising a rear surface having at least one recess defined by a floor and a sidewall; manufacturing a mounting component comprising a front surface having a mounting channel, a rear surface, a peripheral surface, and a flange protruding from the peripheral surface; positioning the mounting component within the recess of the article so that the rear surface of the mounting component is in contact with the floor of the recess and the peripheral surface of the mounting component is spaced apart from the sidewall of the recess by a gap; introducing a bonding agent into the gap between the peripheral surface of the mounting component and the sidewall of the recess so that the flange of the mounting component is located between the bonding agent and the floor of the recess; and allowing the bonding agent to cure to fixedly couple the mounting component to the article and form the wall-mountable assembly.

In yet another aspect, the invention may be a wall mounting apparatus comprising: a wall-mountable assembly comprising: an article formed from a brittle material and comprising a rear surface having at least one recess defined by a floor and a sidewall that extends from the floor to the rear surface; a mounting component formed from a metal or a plastic and comprising a front surface having a mounting channel, a rear surface, a peripheral surface extending between the front and rear surfaces, and a flange protruding from the peripheral surface, wherein the mounting component is positioned within the recess of the article so that the rear surface of the mounting component abuts the floor of the recess of the article and a gap exists between the peripheral surface of the mounting component and the sidewall of the recess of the article; and a bonding agent disposed within the gap between the peripheral surface of the mounting component and the sidewall of the recess of the article to fixedly couple the mounting component to the article; a mounting bracket configured to be mounted to a wall; and wherein the wall-mountable assembly is mounted to the mounting bracket via sliding engagement between the mounting bracket and the mounting component while the mounting bracket is at least partially located within the mounting channel of the mounting component.

In still another aspect, the invention may be an apparatus for mounting an article to a support surface, the apparatus comprising: a mounting bracket comprising a front surface, a rear surface, a bottom end, a top end, a first side surface extending at least partially between the top and bottom ends, and a second side surface extending at least partially between the top and bottom ends, the first and second side surfaces being angled so as to converge towards one another moving in a direction from the bottom end of the mounting bracket towards the top end of the mounting bracket, and the first side surface comprising a first engagement portion and the second side surface comprising a second engagement portion, the first and second engagement portions being beveled so as to slope outwardly moving in a direction from the rear surface of the mounting bracket towards the front surface of the mounting bracket, wherein the mounting bracket is configured to be coupled to a support surface with the rear surface of the mounting bracket facing the support surface; a mounting component comprising a front surface, a rear surface, a bottom end, a top end, and a mounting channel in the front surface, the mounting channel having a longitudinal axis and being at least partially bounded by a sidewall, the sidewall comprising a first sidewall portion located on a first side of the longitudinal axis and a second sidewall portion located on a second side of the longitudinal axis, the first and second sidewall portions being angled so as to converge towards one another moving in a direction from the bottom end of the mounting component towards the top end of the mounting component, and the first and second sidewall portions sloping in a direction away from the longitudinal axis moving from the front surface of the mounting component to the rear surface of the mounting component; and wherein the mounting bracket is configured to be coupled to the mounting component with the mounting bracket at least partially positioned within the mounting channel of the mounting component and the first and second engagement portions of the first and second side surfaces of the mounting bracket engaged with the first and second sidewall portions of the mounting component.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION

Figure 1:
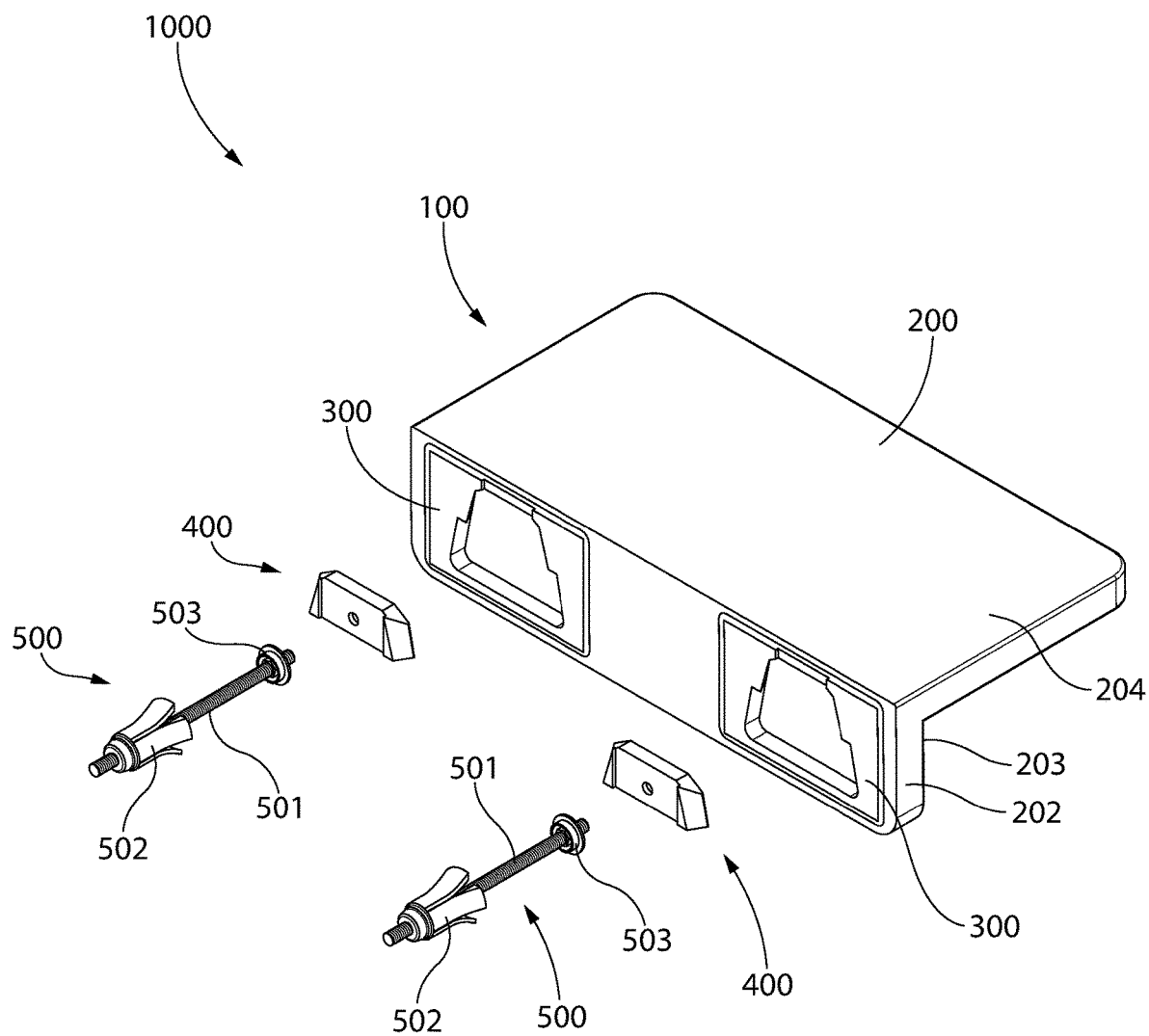
FIG. 1 is an exploded perspective view of a wall mounting apparatus in accordance with an embodiment of the present invention.

The following description of the preferred embodiment(s) is merely exemplary in nature and is in no way intended to limit the invention, its application, or uses.

The description of illustrative embodiments according to principles of the present invention is intended to be read in connection with the accompanying drawings, which are to be considered part of the entire written description. In the description of embodiments of the invention disclosed herein, any reference to direction or orientation is merely intended for convenience of description and is not intended in any way to limit the scope of the present invention. Relative terms such as "lower," "upper," "horizontal," "vertical," "above," "below," "up," "down," "top" and "bottom" as well as derivatives thereof (e.g., "horizontally," "downwardly," "upwardly," etc.) should be construed to refer to the orientation as then described or as shown in the drawing under discussion. These relative terms are for convenience of description only and do not require that the apparatus be constructed or operated in a particular orientation unless explicitly indicated as such. Terms such as "attached," "affixed," "connected," "coupled," "interconnected," and similar refer to a relationship wherein structures are secured or attached to one another either directly or indirectly through intervening structures, as well as both movable or rigid attachments or relationships, unless expressly described otherwise. Moreover, the features and benefits of the invention are illustrated by reference to the exemplified embodiments. Accordingly, the invention expressly should not be limited to such exemplary embodiments illustrating some possible non-limiting combination of features that may exist alone or in other combinations of features; the scope of the invention being defined by the claims appended hereto.

The present invention relates generally to articles that are mounted to a wall and serve a functional purpose. The article may be a ledge or shelf which can be mounted to a wall in a bathroom or in any other room of an interior space without any specific limitation. More specifically, in the exemplified embodiment the article is a floating shelf or ledge, whereby the mounting brackets that facilitate the mounting of the shelf and any fasteners or hardware are hidden from view behind and/or within the body of the shelf. Other uses for the inventive techniques described herein are also possible and may fall within the scope of the claimed invention. That is, other structures or articles that are aesthetic, functional, or both, may utilize the concepts described herein. One example is the use of the mounting components and techniques described herein for a mounting a closet system to a wall. Another example may be the use of the mounting components and techniques for mounting a cabinet to a wall. Modifications may be made to the various components to facilitate the mounting of other items to walls or other support structures (e.g., aesthetic wall or ceiling panels, acoustical wall or ceiling panels, artistic works, mirrors, etc.).

As will be described in greater detail below with specific reference to the figures, the wall mounting apparatus may include an article which has both aesthetic features and functional capabilities. For example, the article may be a ledge or shelf having a desired ornamental appearance and be capable of holding or storing items thereon for display. The article may have a surface ornamentation or design which can appeal to consumers aesthetically. The surface ornamentation may take on many different forms and the specific design of the surface ornamentation is not to be limiting of the invention described herein. The surface ornamentation may be a solid color, multiple colors, or designs including but not limited to designs that are formed from or intended to look like granite, marble, quartz, or the like.

The article of the wall mounting apparatus may be formed, at least in part, from a brittle material. The term "brittle material" is a term of art that is well known to and readily understood by persons of ordinary skill in the art. In particular, a brittle material is a material which has a low ductility and a high hardness value such that the material breaks without significant deformation when under stress. That is, such brittle materials absorb very little, if any, energy before fracture. Brittle materials fail when subjected to stress with little elastic deformation and without significant plastic deformation. Thus, brittle materials go from a first state or shape to complete fracture without much, or in many cases any, deformation. This characteristic allows brittle materials to be pieced back together after fracture because the individual pieces have not plastically deformed. A benefit associated with brittle materials is that if an application can be designed for the brittle material where the brittle material will be subject to applied stress/pressure that is well under its limits, then the material will not deform or break, which provides a much more consistent dimensional performance (there will be no deformation occurring over time which could lead to shape changes and loose hardware). The materials described herein as being brittle are generally brittle at ambient temperature.

Examples of brittle materials as used herein includes solid surface, glass, concrete, ceramic, cast marble, quartz, graphite, and acrylic. In some embodiments, the term brittle material may specifically exclude wood and metal. Materials such as concrete are composite materials that have two or more constituent materials (e.g., polymer+ceramic; ceramic 1+ceramic 2, cement+sand aggregate). In some embodiments, the brittle material may be solid surface material. One major benefit of utilizing solid surface material is that the colors and color combinations that can be used are infinite. Solid surface material can be made in solid colors, mixed colors, and any design imaginable. Solid surface material can mimic the appearance of granite, marble, stone, and other naturally occurring materials. Thus, using solid surface material for wall-mountable articles enables transformation of an interior space in accordance with a designer's preferences and desires. However, due to the brittle nature of solid surface material (and the other brittle materials mentioned herein), such solid surface material (and other brittle material) accessories that are intended to be mounted on a wall or otherwise must interact with other components in certain ways as described herein in order to prevent failure. The invention described herein utilizes brittle materials such as solid surface material in ways not previously considered by understanding the properties and characteristics of the brittle materials and supporting them or interfacing them with other components of the same or different material in specific ways.

Solid surface material is a man-made material formed from alumina trihydrate, acrylic, epoxy or polyester resins, and pigments. Solid surface material is non-porous which lends itself nicely to being useful in many applications, including in commercial kitchens and the like.

Other materials may be used for the article in other embodiments. In an embodiment, the article may be made from metal, such as stainless steel. In an embodiment, the article may be made from wood. Thus, while the techniques and mounting components described herein may be designed for use with brittle materials, they may also be capable of use with non-brittle materials such as those mentioned herein.

Referring to FIG. 1, a wall mounting apparatus 1000 is illustrated in accordance with an embodiment of the present invention. The wall mounting apparatus 1000 may comprise a wall-mountable assembly 100 and at least one mounting bracket 400. In the exemplified embodiment, there are two of the mounting brackets 400, although the invention is not to be so limited and there may be a single mounting bracket 400 or more than two mounting brackets 400 in other embodiments. The wall-mountable assembly 100 may comprise an article 200 and at least one mounting component 300 that is fixedly coupled to the article 200. The mounting component 300 may be a separate and distinct component from the article 200 and may even be formed from a different material than the article 200 as discussed below, but the mounting component 300 is fixedly coupled to the article 200 to form the wall-mountable assembly 100 which is mounted to the mounting bracket 300 which is in turn mounted on a mounting surface such as a wall.

In the exemplified embodiment, there are two of the mounting components 300. However, the invention is not to be so limited and there may be a single mounting component 300 or more than two mounting components 300 in other embodiments. The number of the mounting brackets 400 may be the same as the number of the mounting components 300 in some embodiments. In some embodiments, the mounting component 300 and the mounting bracket 400 may be referred to collectively as a mounting system because the mounting component 300 and the mounting bracket 400 interact with one another to mount or hang the article 200 from a surface such as a wall. Specifically, the mounting bracket 400 may first be mounted to a mounting surface such as a wall, and then the mounting components 300 of the wall-mountable assembly 100 may be brought into slidable engagement with the mounting brackets 400 to mount the wall-mountable assembly 100 to the mounting brackets 400, and hence also to the mounting surface.

Also depicted in FIG. 1 are a pair of fasteners 500. Each of the fasteners 500 may be configured to couple one of the mounting brackets 400 to a mounting surface, which may be a wall within an interior space. However, the mounting surface may be other surfaces, such as the outer surface of a cabinet or the like. In the exemplified embodiment, each of the fasteners 500 comprises a threaded screw member 501 and a fastener member 502 which is threadedly coupled to the threaded screw member 501. The fastener member 502 may be configured to engage a rear surface of the wall or other mounting surface to which the wall mounting apparatus 100 is mounted to ensure that the attachment of the wall-mountable assembly 100 to the mounting surface is strong and secure. However, the invention is not limited to this in all embodiments and other structures can be used to ensure a secure attachment, such as screws and anchors. That is, the fasteners 500 may comprise a screw alone, a screw in combination with an anchor, a screw 501 in combination with the fastener member 502 as shown, or any other fastener-type member which is designed and configured to securely couple an item or article to a mounting surface such as a wall. The threaded screw member 501 may be passed through a through-hole in the mounting bracket 400 to mount the mounting bracket 400 to a mounting surface, as will be described in greater detail below with reference to FIGS. 10 and 11.

Figure 2:
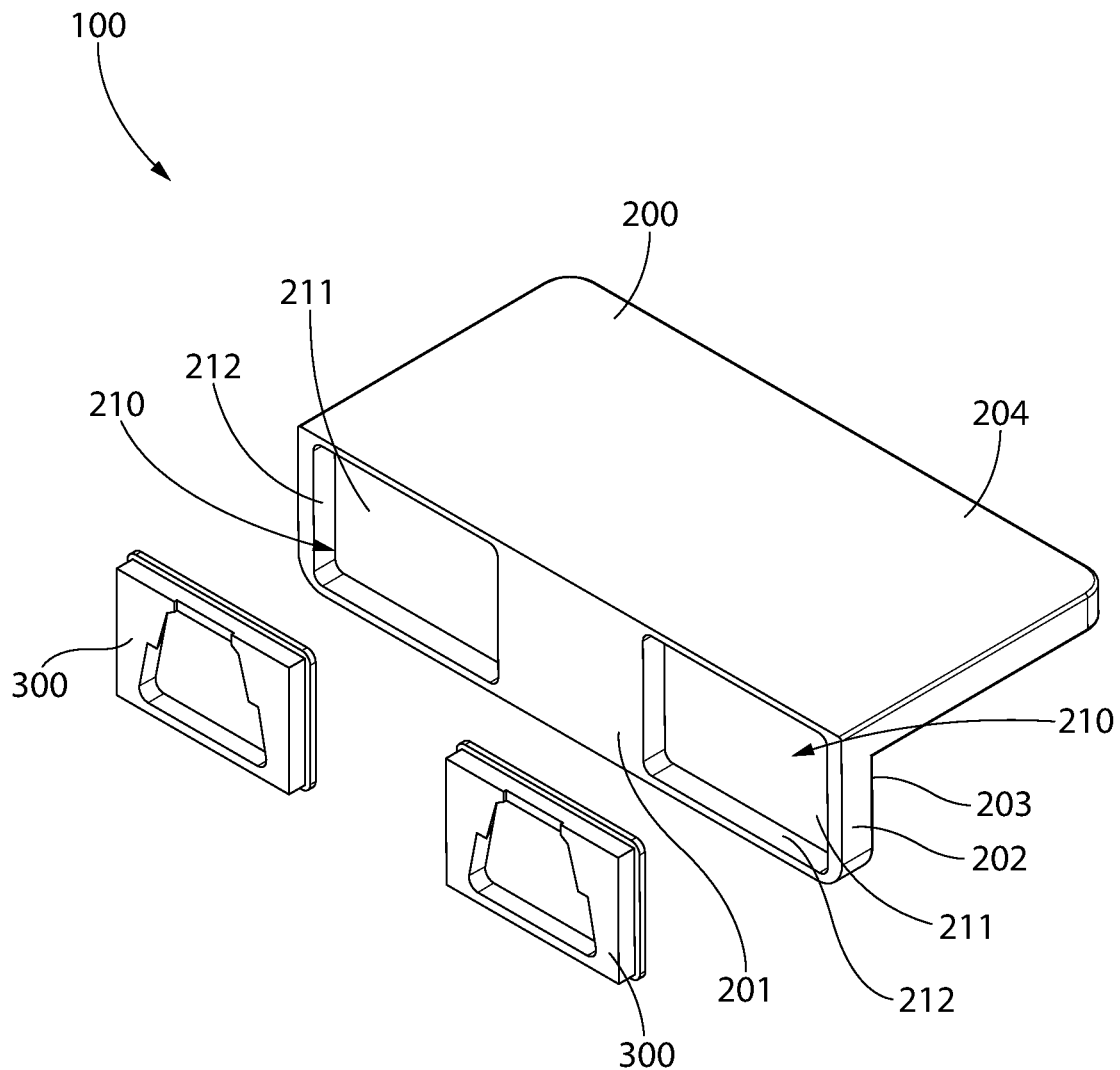
FIG. 2 is an exploded view of a wall-mountable assembly of the wall mounting apparatus of FIG. 1.

Referring to FIG. 2, the wall-mountable assembly 100 will be described in greater detail. As noted above, the wall-mountable assembly 100 may comprise the article 200 and at least one of the mounting components 300, which may be separate components (i.e., the mounting components 300 may not be integrally formed with the article 200, but may be coupled thereto as described herein to form the wall-mountable assembly 100). In the exemplified embodiment, the article 200 is a shelf or a ledge. However, the invention is not to be so limited in all embodiments and the article 200 may take on other forms, such as being other décor items configured for hanging on a wall, such as a cabinet, a bathroom accessory, a frame, or the like. The article 200 may be formed from a brittle material, as defined above. In some embodiments, the brittle material may be a solid surface material as that allows the article 200 to be formed in essentially infinite colors and design configurations. The brittle material may be other materials such as those noted above.

The article 200 comprises a rear surface 201 that is configured to abut against the mounting surface or wall when the article 200 is mounted thereon. In the exemplified embodiment whereby the article 200 is a shelf, the article 200 comprises an apron portion 202 comprising the rear surface 201 and a front surface 203 and a ledge portion 204 protruding from the front surface 203 of the apron portion 202. The ledge portion 204 protrudes from the apron portion 202 along a top edge of the apron portion 202 in the exemplified embodiment, but the ledge portion 204 may protrude from the apron portion 202 at other locations, including along the bottom edge of the apron portion 202 or in the space between the top and bottom edges of the apron portion 202. The ledge and apron portions 204, 202 may have the same height in some embodiments so that the article 200 is a linear structure rather than an L-shaped structure. The ledge portion 204 may protrude horizontally from the mounting surface or wall when the article 200 is mounted on the mounting surface. A top surface of the ledge portion 204 may be capable of having items stored thereon for display and/or storage. The article 200 may include a perimeter wall along a periphery of the ledge portion 204 to prevent items stored thereon from rolling or otherwise falling off, although this is not required in all embodiments. Additional features may be added to the article 200, such as, for example without limitation, hooks for hanging coats, hats, bags, or the like, racks for holding towels, and drawers for item storage. Moreover, the article 200 may take on other forms as noted above and the invention is not limited to the article 200 being a shelf in all embodiments.

The article 200 may comprise at least one recess 210 in the rear surface 201 (which is configured to abut against the mounting surface/wall as noted above). In the exemplified embodiment, there are two of the recesses 210. However, there may just be one of the recesses 210 and there may be more than two of the recesses 210 in other embodiments. The length, weight, and other characteristics of the article 200 may dictate how many of the recesses 210 are included, since each of the recesses 210 is configured to be associated with one of the mounting components 300, as shown in FIG. 1 and described in more detail below. Thus, the greater the length and/or weight of the article 200, the more recesses 210, mounting components 300 and mounting brackets 400 may be needed to adequately support the article 200 on the mounting surface or wall. Each of the recesses 210 may comprise a floor 211 that is recessed relative to the rear surface 201 of the article 200 and a sidewall 212 that extends from the floor 211 to the rear surface 201. Each of the recesses 210 is illustrated as being square or rectangular with rounded corners in the exemplified embodiment. However, other shapes for the recesses 210 are possible in other embodiments. The shape of the recesses 210 may generally correspond with the shape of the mounting components 300 that are intended to be received within the recesses 210. Moreover, while in the exemplified embodiment the two recesses 210 have an identical size and shape, the invention is not limited to this in all embodiments and the recesses 210 may have different shapes and/or different sizes in other embodiments. The depth of the recesses 210 measured from the rear surface 201 of the article 200 to the floor 211 of the recess 210 may also generally correspond to the thickness of the mounting components 300 in some embodiments.

In FIG. 2, the mounting components 300 are illustrated separate from the article 200 because the mounting components 300 are separate and distinct components from the article 200 as noted above. The mounting components 300 are configured to be fixedly coupled to the article 200 within the recesses 210 to form the wall-mountable assembly 100. As noted above, in some embodiments the article 200 may be formed from a brittle material such as a solid surface material. Thus, the mounting component 300 may not be able to be coupled to the article 200 with a fastener such as a screw, and nor may it be possible or advisable to build the mounting channel directly into the brittle material of the article 200. One or more exemplary techniques for attaching the mounting components 300 to the article 200 will be described below with reference to FIGS. 4-6.

Figure 3A:
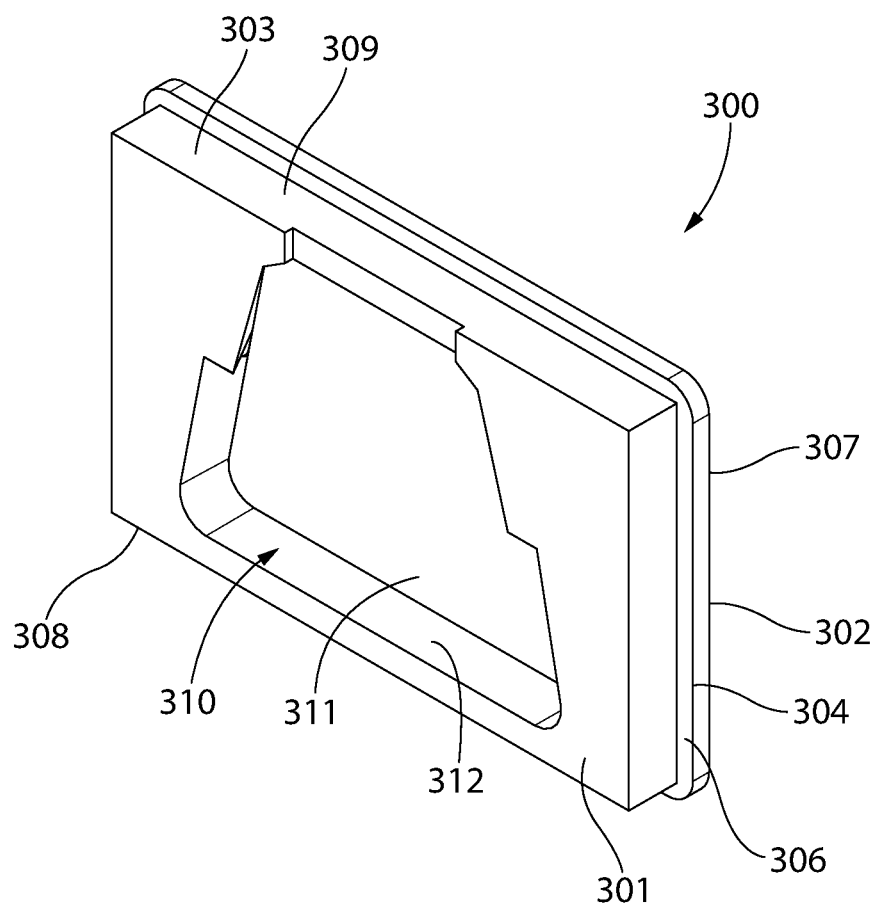
FIG. 3A is a perspective view of a mounting component of the wall mounting apparatus of FIG. 1.
Figure 3B:
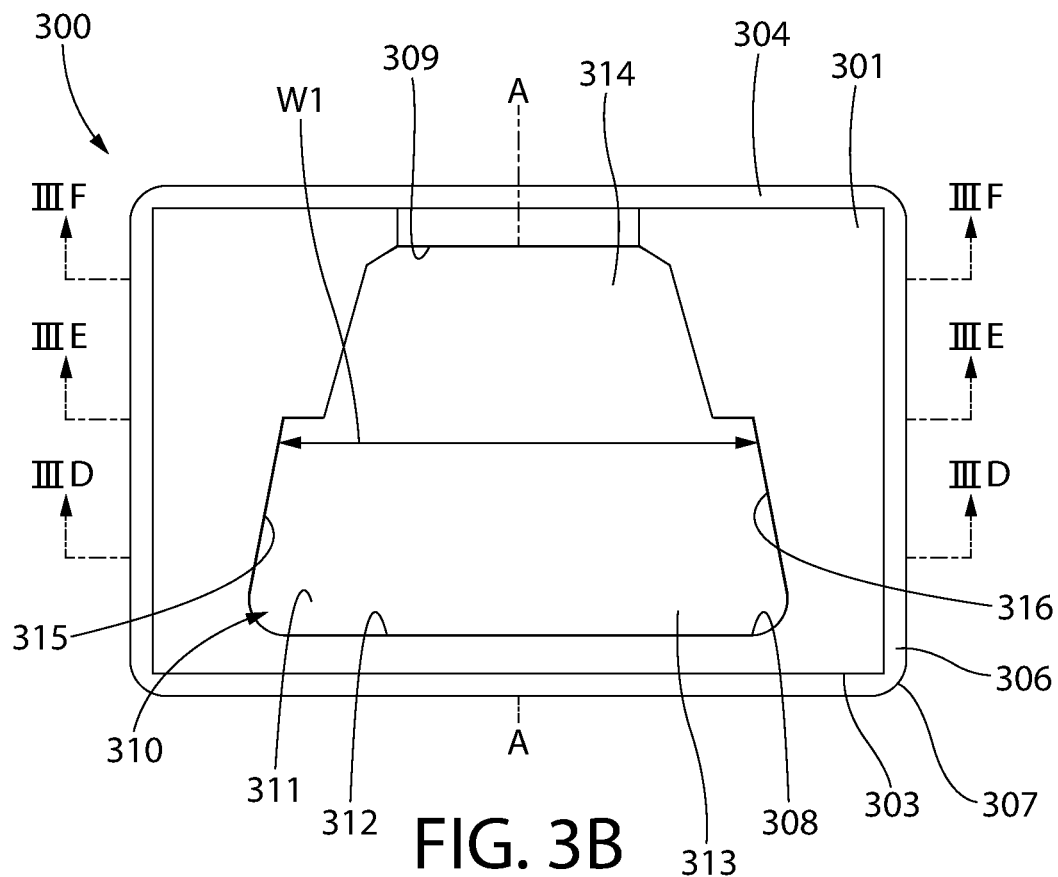
FIG. 3B is a front view of the mounting component of FIG. 3A.
Figure 3C:
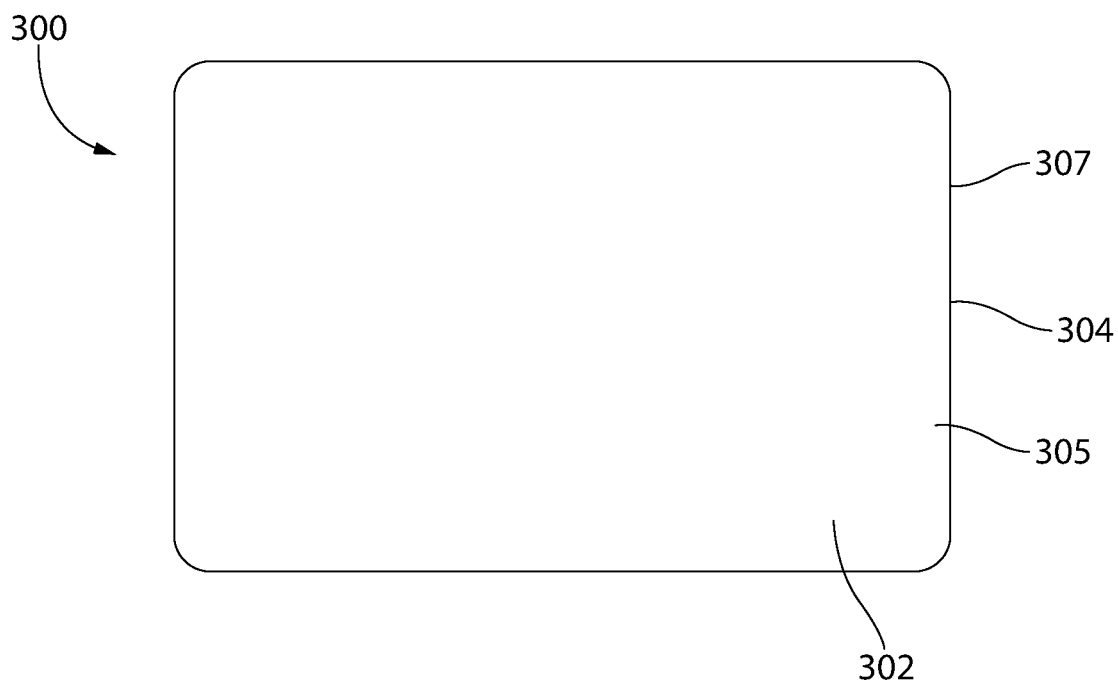
FIG. 3C is a rear view of the mounting component of FIG. 3A.

Referring to FIGS. 3A-3C, the mounting component 300 will be described. The mounting component 300 may be formed from metal or plastic (hard/rigid plastic) in some embodiments. In one embodiment, the mounting component 300 may be formed from aluminum. However, the invention is not to be so limited in all embodiments and the mounting component 300 may be formed from other materials in other embodiments. Because the mounting component 300 is configured to engage with the mounting bracket 400, it may be preferable to form the mounting component 300 from a material which is suitable for such engagement without the potential for breakage or other failure. Thus, metal or plastic may be a preferred material for the mounting component 300 in some embodiments. The mounting component 300 may be rectangular or square in shape with rounded corners as shown, or it may have other shapes. As mentioned above, the shape of the mounting component 300 may correspond with the shape of the recess 210 in the rear surface 201 of the article 200 within which the mounting component 300 is positioned when fixedly coupled to the article 200.

The mounting component 300 comprises a front surface 301, a rear surface 302, and a peripheral surface 303 extending between the front and rear surfaces 301, 302. The mounting component 300 may comprise a flange 304 protruding from the peripheral surface 303. The flange 304 may protrude from the peripheral surface 303 at a location or position that is adjacent to the rear surface 302. In particular, the flange 304 may comprise a rear surface 305 and a front surface 306 that is opposite the rear surface 305. The rear surface 305 of the flange 304 may be flush with the rear surface 302 of the mounting component 300 such that the rear surface 302 of the mounting component 300 and the rear surface 305 of the flange 304 forms a seamless, continuous, flat, planar surface. The flange 304 may protrude radially outward from the peripheral surface 303. In the exemplified embodiment, the flange 304 is a continuous annular flange that protrudes radially outward along an entirety of the peripheral surface 303. However, the invention is not to be so limited in all embodiments and the flange 304 may be discontinuous in other embodiments or may extend along only parts of the peripheral surface 303 but not the entirety of the peripheral surface 303. That is, the flange 304 may comprise flange segments that are spaced apart from one another, or the flange 304 may be formed by a plurality of discrete tabs that protrude from the peripheral surface 303. The front surface 306 of the flange 304 may form a ledge that extends or protrudes from the peripheral surface 303 of the mounting component 300 which is visible from the front surface 301 of the mounting component 300. The flange 304 may terminate in a distal surface or distal edge 307 that is positioned radially outward relative to the peripheral surface 303 of the mounting component 300.

The mounting component 300 has a first thickness measured between the front and rear surfaces 301, 302 of the mounting component 300. The flange 304 has a second thickness measured between the front and rear surfaces 305, 306 of the flange 304. The second thickness is less than the first thickness. The second thickness may be less than one third of the first thickness in some embodiments.

The mounting component 300 also comprises a mounting channel (or mounting recess) 310 that is formed into the front surface 301 of the mounting component 300. The mounting channel 310 may be a recess that is formed into the front surface 301 of the mounting component 300. The mounting channel 310 may be defined by a floor 311 that is recessed relative to the front surface 301 of the mounting component 300 and a sidewall 312 that extends from the floor 311 to the front surface 301 of the mounting component 300. In other embodiments, the mounting channel 310 may not comprise a floor, and in such embodiments the mounting channel 310 may be a through-hole or aperture in the mounting component 300 which extends from the front surface 301 to the rear surface 302. In such embodiments, the mounting channel 310 may be defined solely by the sidewall 312 which may extend the full depth between the front and rear surfaces 301, 302.

The mounting channel 310 comprises a bottom edge 308 and a top edge 309. The mounting channel 310 comprises a longitudinal axis A-A extending in a direction between the bottom and top edges 308, 309. Furthermore, the mounting channel 310 may comprise an insertion region 313 at which the mounting bracket 400 is received within the mounting channel 310 and a nesting region 314 at which the mounting bracket 400 is coupled or locked to the mounting component 300. The insertion region 313 may be located adjacent to the bottom edge 308 of the mounting channel 310 and the nesting region 314 may be located adjacent to the top edge 309 of the mounting channel 310.

The sidewall 312 defining the mounting channel 310 comprises a first portion 315 located on a first side of the longitudinal axis A-A and a second portion 316 located on a second side of the longitudinal axis A-A. Along the insertion region 313 and the nesting region 314 of the mounting channel 310, the first and second portions 315, 316 of the sidewall 312 may be angled inwardly towards the longitudinal axis A-A as they extend in a generally axial direction moving from the bottom edge 308 of the mounting channel 310 towards the top edge 309 of the mounting channel 309. Moreover, the first and second portions 315, 316 of the sidewall 312 may be oriented perpendicular to the longitudinal axis A-A in a transition region between the insertion and nesting regions 313, 314. Thus, the width W1 of the mounting channel 310 decreases moving from the bottom edge 308 towards the top edge 309 to create a tight fit between the mounting channel 310 and the mounting bracket 400 during slidable coupling.

Figure 3D:
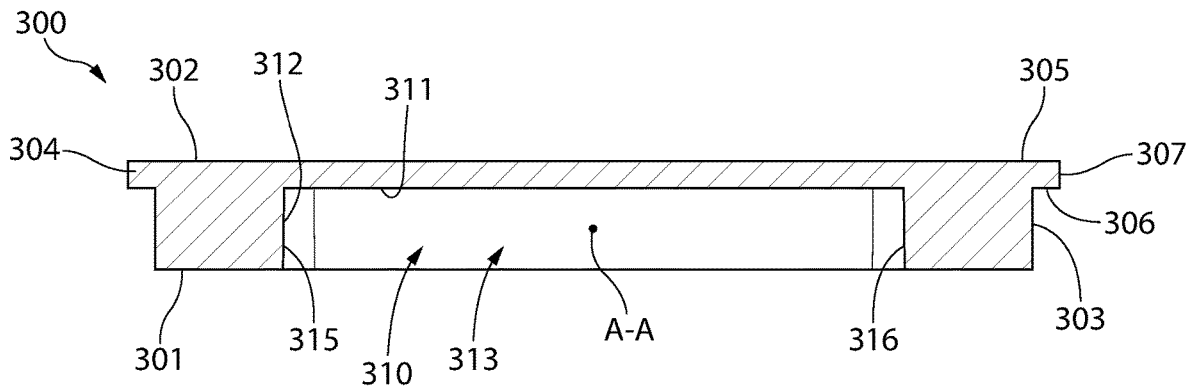
FIG. 3D is a cross-sectional view taken along line IIID-IIID of FIG. 3B.
Figure 3E:
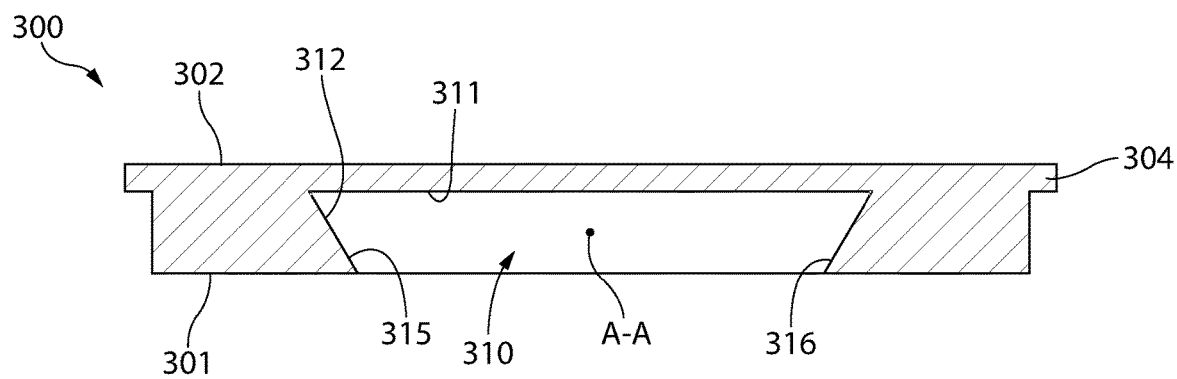
FIG. 3E is a cross-sectional view taken along line IIIE-IIIE of FIG. 3B.

Referring to FIG. 3B in conjunction with FIGS. 3D-3F, the configuration of the first and second portions 315, 316 of the sidewall 312 will be described. FIG. 3D is a cross-sectional view taken through the first and second portions 315, 316 of the sidewall 312 along the insertion region 313 of the mounting channel 310. In this location, the first and second portions 315, 316 of the sidewall 312 may extend in a vertical direction that is perpendicular to the front and rear surfaces 301, 302 of the mounting component 300 along the insertion portion 313 of the mounting channel 310. FIG. 3E is a cross-sectional view taken through the first and second portions 315, 316 of the sidewall 312 along the nesting region 313 of the mounting channel 310. In this location, the first and second portions 315, 316 of the sidewall 312 may be angled inwardly towards the longitudinal axis A-A moving in a direction from the floor 311 of the mounting channel 310 (or the rear surface 302 of the mounting component 300) towards the front surface 301 of the mounting component 300. This causes the mounting channel 310 to have a dovetail shape within the nesting region 314 of the mounting channel 310. This may facilitate the creation of an interlock between the mounting component 300 and the mounting bracket 400 as the mounting bracket 400 slides upwardly within the mounting channel 310 from the insertion region 313 to the nesting region 314 as described further below.

Figure 3F:
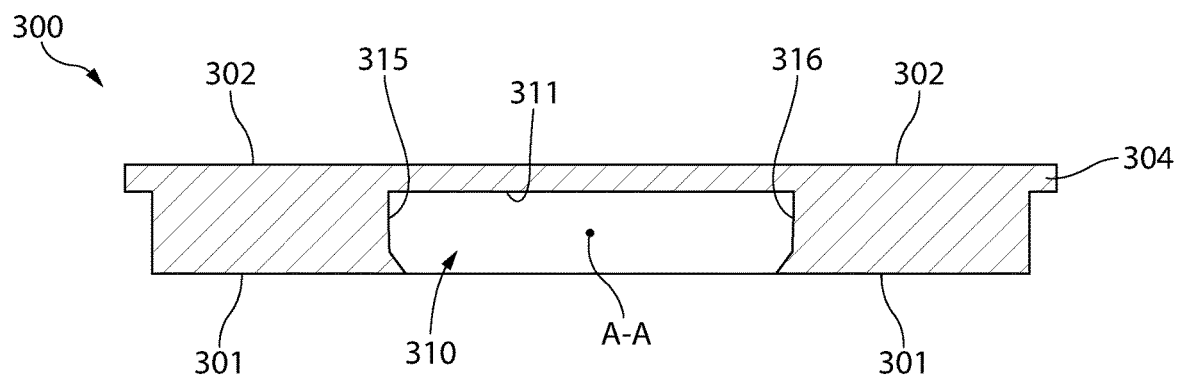
FIG. 3F is a cross-sectional view taken along line IIIF-IIIF of FIG. 3B.

Finally, FIG. 3F is a cross-sectional view taken through the first and second portions 315, 316 of the sidewall 312 along a top region of the mounting channel 310. In this location, the first and second portions 315, 316 of the sidewall 312 may comprise a vertical portion that extends from the floor 311 to a transition region and an angled portion that extends from the transition region to the front surface 301 of the mounting component 300.

Figure 4:
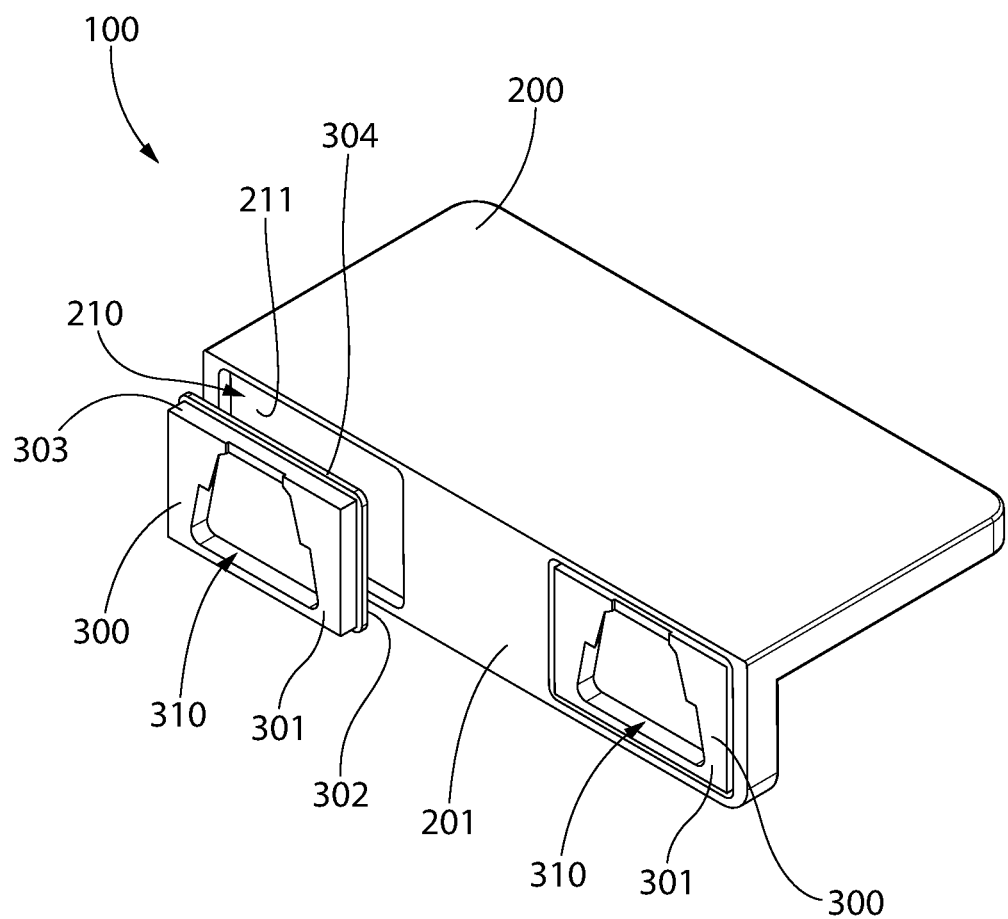
FIG. 4 is a perspective view illustrating the wall-mountable assembly of FIG. 2 including an article, a first one of the mounting components of FIG. 3A coupled to the article, and a second one of the mounting components of FIG. 3A positioned adjacent to the article in preparation for being coupled thereto.
Figure 5A:
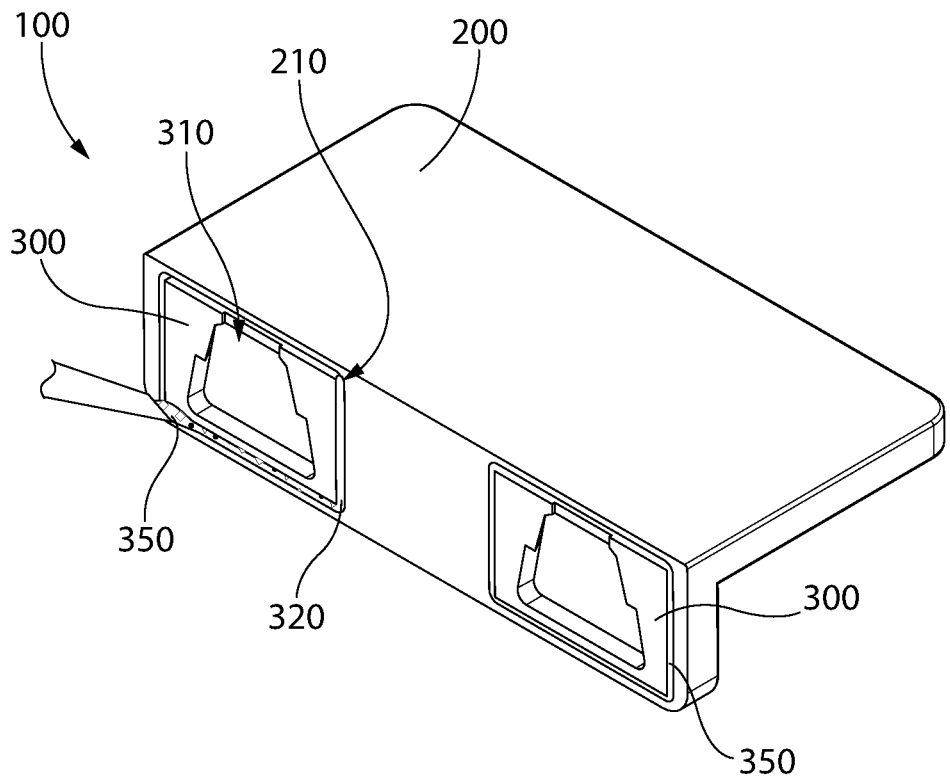
FIG. 5A is a perspective view illustrating the second one of the mounting elements from FIG. 4 being coupled to the article with a bonding agent.
Figure 5B:
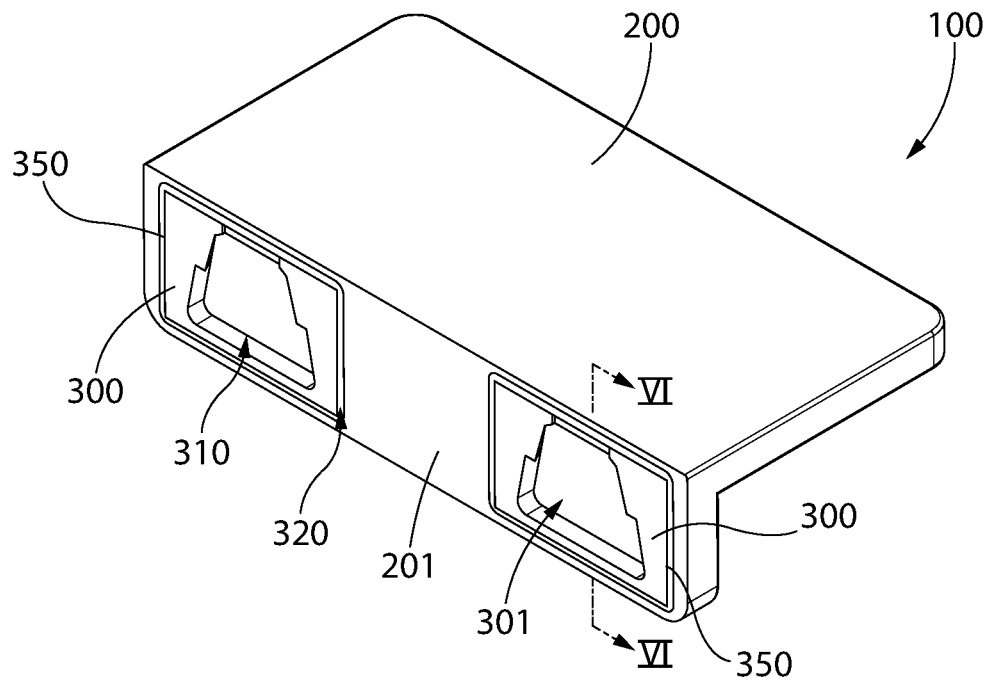
FIG. 5B is a perspective view illustrating the first and second ones of the mounting elements coupled to the article.
Figure 6:
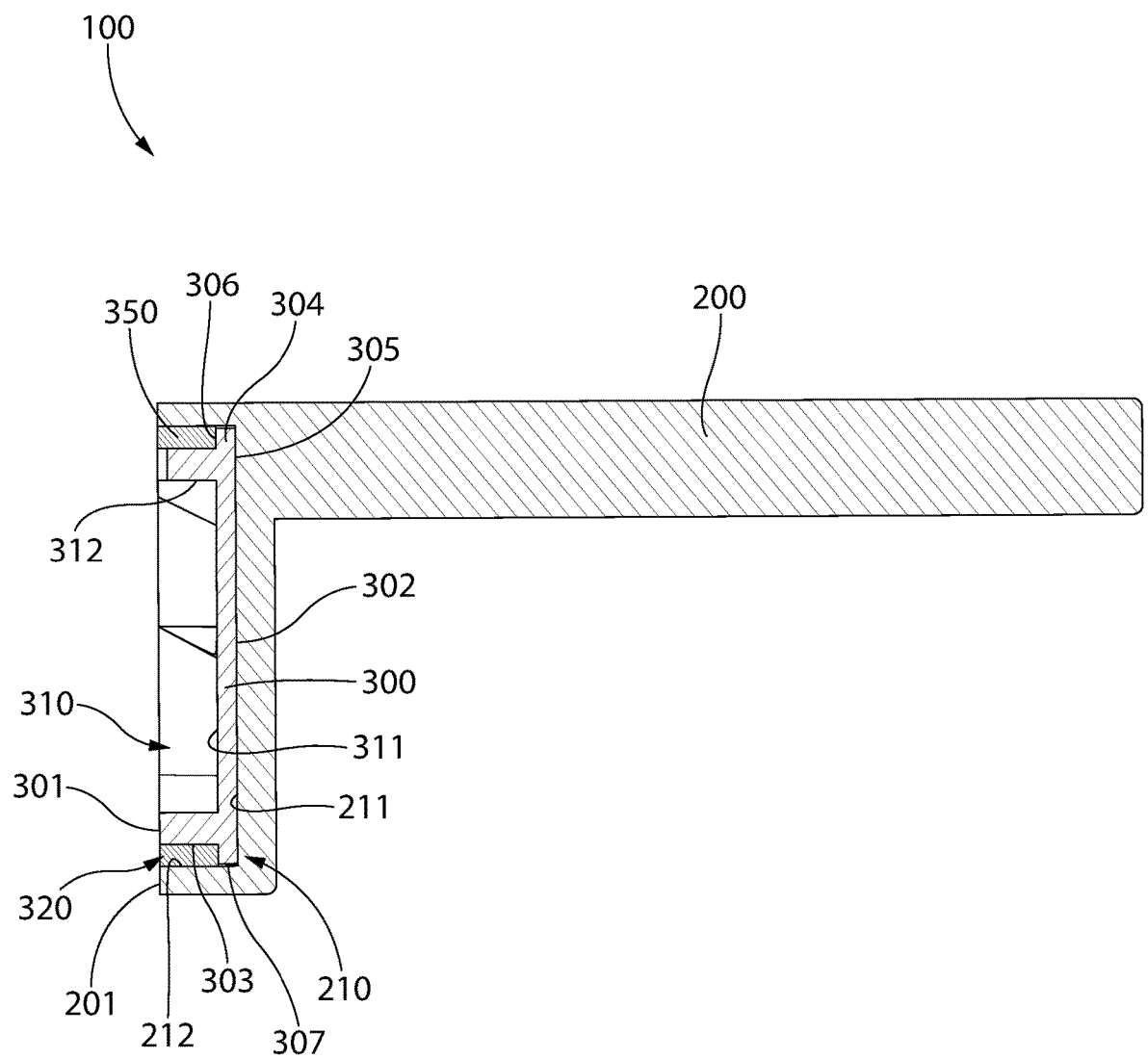
FIG. 6 is a cross-sectional view taken along line VI-VI of FIG. 5B.

Referring to FIGS. 4-6, the coupling of the mounting components 300 to the article 200 to form the wall-mountable assembly 100 will be described. FIG. 4 illustrates the article 200 with one of the mounting components 300 nesting within one of the recesses 210 and another one of the mounting components 300 positioned adjacent to the other one of the recesses 210 in the rear surface 201 of the article 200. As noted above, the mounting component 300 may have a shape which corresponds to the shape of the recess 210 to enable the mounting component 300 to fit within the recess 210 in the rear surface 201 of the article 200. Thus, the next step in the manufacturing process is to position the mounting component 300 that is not currently within one of the recesses 210 into the recess 210. In particular, the mounting component 300 may be inserted into the recess 210 with the rear surface 302 of the mounting component 300 facing the floor 211 of the recess 210. The mounting component 300 may be moved towards the floor 211 of the recess 210 until the rear surface 302 of the mounting component 300 is in contact with the floor 211 of the recess 210.

FIG. 6 illustrates the positioning of the mounting component 300 within the recess 210 of the article 200. That is, FIG. 6 illustrates the rear surface 302 of the mounting component 300 in abutting contact with the floor 211 of the recess 210. The length and width of the recess 210 is sufficiently large to enable the entirety of the mounting component 300, including the flange 304, thereof to fit therein. That is, the mounting component 300 has a length and a width measured at the distal edge 307 of the flange 304 and the recess 210 has a length and a width, the length and width of the recess 210 being equal to or greater than the length and width of the mounting component 300 to ensure that the mounting component 300 can fit within the recess 210. In the exemplified embodiment, the distal ends 307 of the flange 304 are either in abutting contact with or immediately adjacent to the sidewall 212 of the recess 210 with only a small gap (i.e., 0.1-1 mm) for tolerance. The distal ends 307 of the flange 304 may be spaced further from the sidewall 212 of the recess 210 in other embodiments. As discussed below, if such a space exists it would be filled with a bonding agent during the next steps of the wall-mountable assembly manufacturing process, and thus the exact dimensions of any space or gap between the distal end 307 of the flange 304 and the inner surface 212 of the sidewall 210 is not limiting of the invention in all embodiments.

Still referring to FIG. 6, as noted above the flange 304 protrudes radially outward (i.e., away from a centerpoint of the mounting component 300) from the peripheral surface 303 of the mounting component 300. When the mounting component 300 is positioned within one of the recesses 210 in the rear surface 201 of the article 200, the peripheral surface 303 of the mounting component 300 is positioned inward of the distal edge 307 of the flange 304. Thus, a gap 320 exists between the peripheral surface 303 of the mounting component 300 and the sidewall 212 of the recess 210. In the exemplified embodiment, the gap 320 extends around an entire circumference of the mounting component 300 (the circumference being defined by the peripheral surface 303).

However, the gap 320 may extend along a portion of, but not the entirety of, the circumference of the mounting component 300 in other embodiments. The gap 320 extends from the front surface 306 of the flange 304 to the front surface 301 of the mounting component 300. Thus, after the mounting component 300 is positioned within the recess 210 in the rear surface 201 of the article 200, the gap 320 is visible/exposed.

Once the mounting component 300 is positioned within the recess 210, steps may be taken to secure or fixedly couple the mounting component 300 to the article 200 within the recess 210. That is, the simple action of positioning the mounting component 300 into the recess 210 may not securely couple the mounting component 300 to the article 200, and the mounting component 300 could be easily removed from the recess 210 by a user applying a pulling force onto the mounting component 300 relative to the article or manipulating the article 200 so that its rear surface 201 faces downwardly which would cause the mounting component 300 to fall out of the recess 210 via gravity. There could be a tight fit between the mounting component 300 and the sidewall 212 of the recess 210 which could prevent the gravity-driven detachment, but such a tight fit engagement is still likely insufficient for a secure coupling between the mounting component 300 and the article 200.

Thus, referring to FIGS. 5A-6, the next step in the process of manufacturing the wall-mountable assembly 100 is to introduce a bonding agent 350 into the gap 320 between the peripheral surface 303 of the mounting component 300 and the sidewall 212 of the recess 210. The bonding agent 350 may be introduced into the gap 320 until the bonding agent 350 substantially fills the entirety of the gap 320. Thus, the bonding agent 350 may contact the front surface 306 of the flange 304 of the mounting component 300 and may extend within the gap 320 so as to be flush with the rear surface 201 of the article 200. However, the bonding agent 350 may not extend all the way to the rear surface 201 of the article 200 in all embodiments and may instead simply fill in a part of the depth of the gap 320. The bonding agent 350 may be introduced into the entirety of the gap 320 whether it fills the full depth of the gap 320 or not.

The bonding agent 350 may be an adhesive composition that is configured to bond to at least one of the sidewall 212 of the recess 210 of the article 200, the front surface 306 of the flange 304 of the mounting component 300, and the peripheral surface 303 of the mounting component 300. In one embodiment, the bonding agent 350 may bond to the sidewall 212 of the recess 210, thereby trapping or sandwiching the flange 304 of the mounting component 300 between the bonding agent 350 and the floor 211 of the recess 210 of the article 200. The bonding agent 350 may specifically bond to any one of the surfaces noted above or to all of the surfaces noted above.

The bonding agent 350 may be an epoxy adhesive, and more specifically a reactive epoxy adhesive. The bonding agent 350 may be a two-part epoxy adhesive which comprises a resin and a hardener. The bonding agent 350 may be a methacrylate adhesive such as a methyl methacrylate adhesive in some embodiments. Such an adhesive has good bonding qualities for solid surface, granite, engineered stone, quartz, ceramic, natural stone, and the like. An example of a bonding agent or reactive adhesive that may be used in accordance with the invention set forth herein is Component Bonder by Integra Adhesives®, which is a quick drying acrylic structural adhesive. A polyester resin and hardener two-part epoxy may also be used. The reactive adhesive or epoxy adhesive described throughout this disclosure may cure as a structural thermoplastic. Moreover, the brittle materials described herein (e.g., the solid surface materials or the like) may also cure as a structural thermoplastic. This may lend itself to ensuring a very strong bond when two components are adhered together using the reactive or epoxy adhesive. The term bonding agent 350 may include epoxy adhesives, but may not be so limited in all embodiments and may include other adhesive compositions After the bonding agent 350 is deposited or introduced into the gap 320, the bonding agent 350 is allowed to dry and cure. During the curing process, the bonding agent 350 bonds to at least one (and potentially all) of the sidewall 212 of the recess 210, the flange 304 of the mounting component 300, and the peripheral surface 303 of the mounting component 300. Thus, once the bonding agent 350 has cured, the mounting component 300 is fixedly coupled to the article 200 within the recess 210. The mounting component 300 at this point cannot be separated from the article 200 without breaking and/or removing the cured bonding agent 350 from the gap 320. The bond is sufficiently strong to withstand a great deal of force as it will maintain the mounting component 300 coupled to the article 200 while the wall-mountable assembly 100 is mounted to the mounting bracket 400 and supporting a load.

In the exemplified embodiment, the bonding agent 350 is located only in the gap 320 between the peripheral surface 303 of the mounting component 300 and the sidewall 212 of the recess 210 of the article 200. Thus, there may be no bonding agent of any kind (no adhesive or other composition or substance intended to bond or adhere components together) located between the rear surface 302 of the mounting component 300 (including the rear surface 305 of the flange 304) and the floor 211 of the recess 210 of the article 200. This ensures that the mounting component 300 is appropriately positioned within the recess 210 because any adhesive or other bonding agent between the rear surface 302 of the mounting component 300 and the floor 211 of the recess 210 could result in inconsistencies. Nonetheless, in some embodiments there may be a bonding agent, adhesive, or the like positioned between the rear surface 302 of the mounting component 300 and the floor 211 of the recess 210, although this is generally not necessary because the bonding agent 350 in the gap 320 is sufficient to securely and fixedly couple the mounting component 300 to the article 200 to form the wall-mountable assembly 100. It may also be possible to attach the mounting component 300 to the article 200 with a fastener such as a screw or the like, although this may not be possible or effective depending on the material of the article 200.

Referring to FIGS. 7A-7D, the mounting bracket 400 will be described. The mounting bracket 400 comprises a front surface 401 and a rear surface 402 opposite the front surface 401. The mounting bracket 400 is configured to be mounted or otherwise coupled to a mounting surface such as a wall with the rear surface 402 facing and abutting the mounting surface or wall. The mounting bracket 400 further comprises a through-hole 403 that extends through the thickness of the mounting bracket 400 from the front surface 401 to the rear surface 402. The through-hole 403 is configured to receive a fastener, such as the fastener 500, or the threaded screw 501 thereof, to facilitate the coupling of the mounting bracket 400 to the mounting surface or wall. In the exemplified embodiment, the mounting bracket 400 comprises a recess region 409 formed into the rear surface 402. The recess region 409 may be omitted in other embodiments The mounting bracket 400 further comprises a bottom surface 404 and a top surface 405. The mounting bracket 400 comprises a longitudinal axis B-B that extends in the direction between the bottom and top surfaces 404, 405. The mounting bracket 400 may comprise a first engagement surface 410 located on a first side of the longitudinal axis B-B and a second engagement surface 420 located on a second side of the longitudinal axis B-B. Each of the first and second engagement surfaces 410, 420 extends between the bottom and top surfaces 404, 405 and face outwardly in a direction away from the longitudinal axis B-B. The engagement surfaces 410, 420 may form the lateral side surfaces of the mounting bracket 400.

Figure 7A:
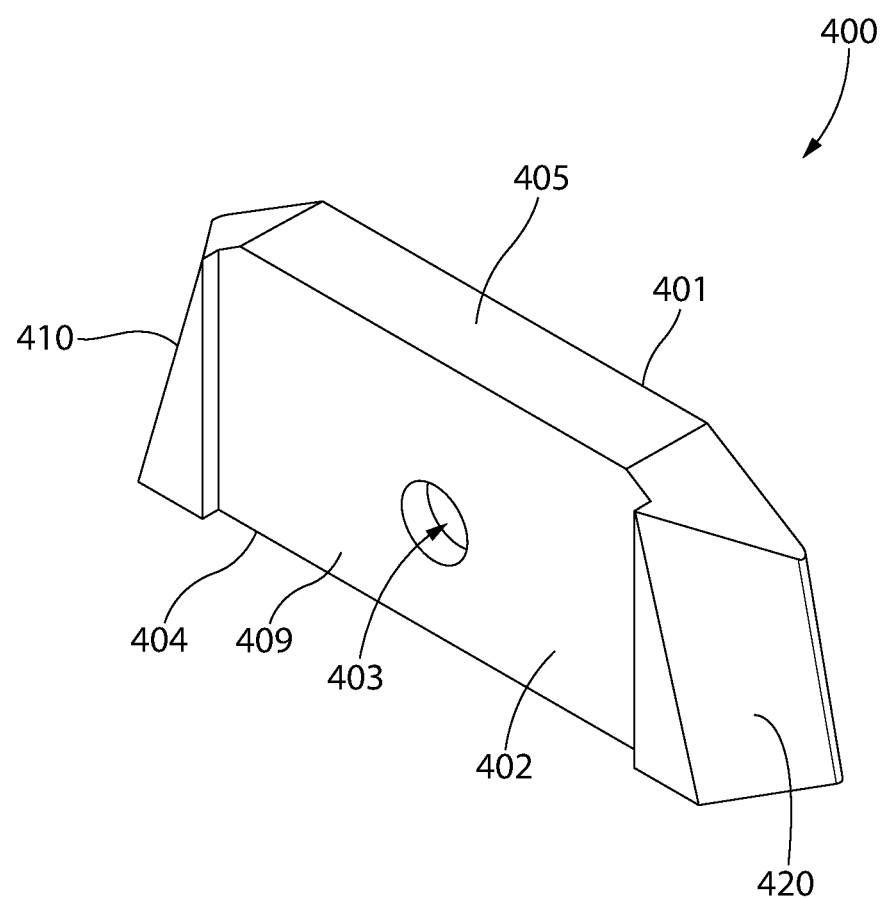
FIG. 7A is a perspective view of a mounting bracket of the wall mounting apparatus of FIG. 1.
Figure 7B:
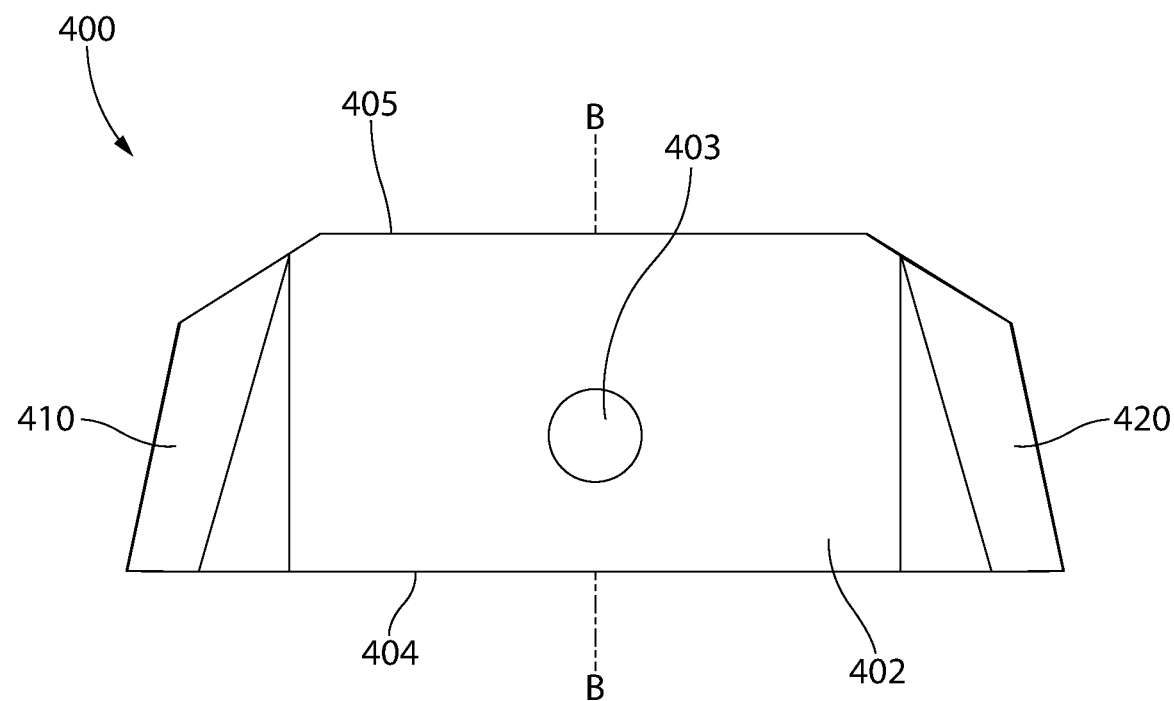
FIG. 7B is a rear view of the mounting bracket of FIG. 7A.
Figure 7C:
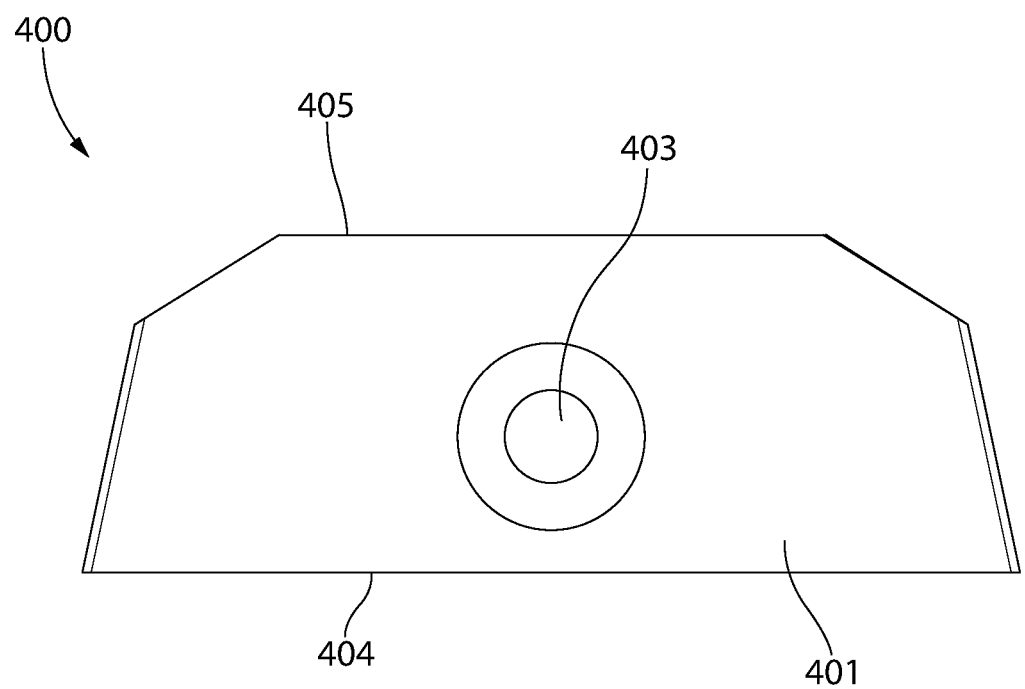
FIG. 7C is a front view of the mounting bracket of FIG. 7A.
Figure 7D:
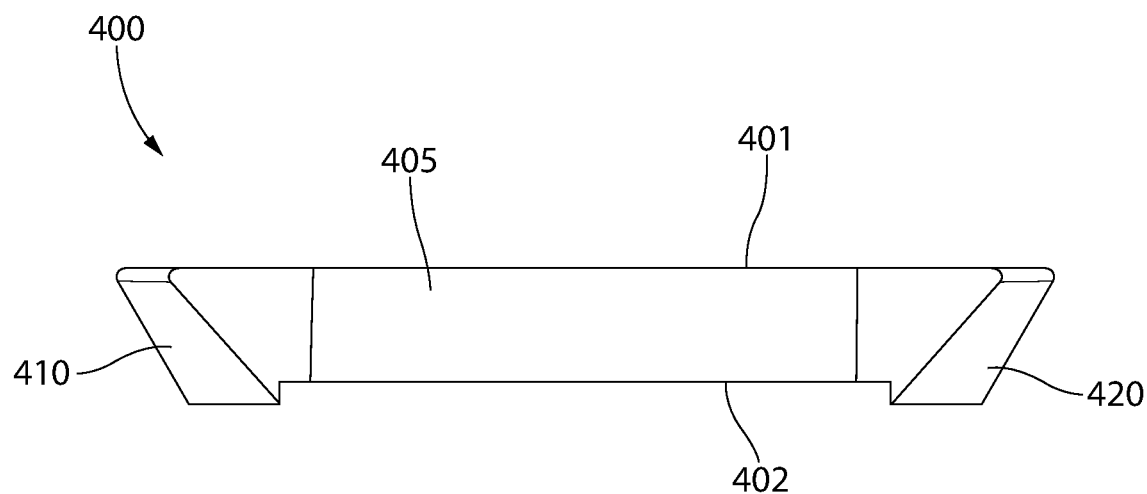
FIG. 7D is a top view of the mounting bracket of FIG. 7A.

In the exemplified embodiment, the first and second engagement surfaces 410, 420 are angled inwardly towards the longitudinal axis moving in a direction from the front surface 401 towards the rear surface 402. This facilitates the mating engagement between the first and second engagement surfaces 410, 420 of the mounting bracket 400 and the first and second portions 315, 316 of the sidewall 312 of the mounting channel 310 of the mounting component 300, as described below with reference to FIG. 9. Furthermore, as best seen in FIG. 7D, in the exemplified embodiment a slope of the first and second engagement surfaces 410, 420 may increase moving in a direction from the top surface 405 of the mounting bracket 400 to the bottom surface 404 of the mounting bracket 400. This may facilitate a wedging of the mounting bracket 400 within the mounting channel 310 of the mounting component 300 as the mounting bracket 400 slides upwardly from the insertion region 313 of the mounting channel 310 to the nesting region 314 of the mounting channel 310. That is, the engagement between the mounting bracket 400 and the mounting component 300 becomes tighter as the mounting bracket 400 slides further upwardly within the mounting channel 310 of the mounting component 300. In some embodiments, the slope of the first and second engagement surfaces 410, 420 may be constant and uniform (i.e., the slope may not increase or decrease at all). In an embodiment, the combination of the first and second engagement surfaces 410, 420 being angled between the bottom and top surfaces 404, 405 and being angled between the front and rear surfaces 401, 402 achieves the desired tight fit to the mounting components 300 during installation.

In an exemplified embodiment, the first and second engagement surfaces 410, 420 may have a first slope measured at the top surface 405 and a second slope measured at the bottom surface 404, the second slope being greater than the first slope. Furthermore, the slope of the first and second engagement surfaces 410, 420 may continually and gradually increase moving from the top surface 405 to the bottom surface 404 of the mounting bracket 400. The slope is measured as the incline of the first and second engagement surfaces 410, 420 moving in a direction from the rear surface 402 of the mounting bracket 400 to the front surface 401 of the mounting bracket 400. The slope of the first and second engagement surfaces 410, 420 may be positive from the top end 405 to the bottom end 404, but greater at the bottom end 404 than at the top end 405 as noted herein. And to repeat, the slope of the first and second engagement surfaces 410, 420 may be constant in some embodiments.

Figure 8A:
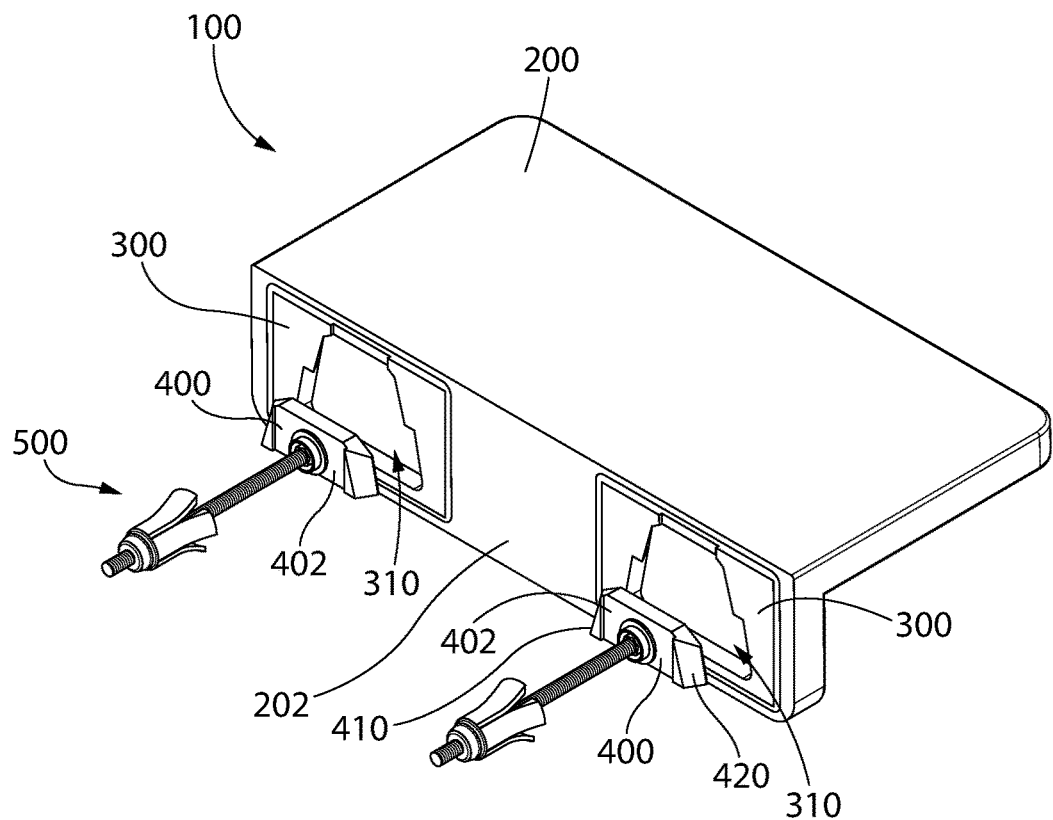
FIG. 8A is a perspective view illustrating a one of the mounting brackets and a second one of the mounting brackets of FIG. 4A positioned adjacent to the first and second ones of the mounting elements of the wall-mountable assembly in preparation for coupling thereto.
Figure 8B:
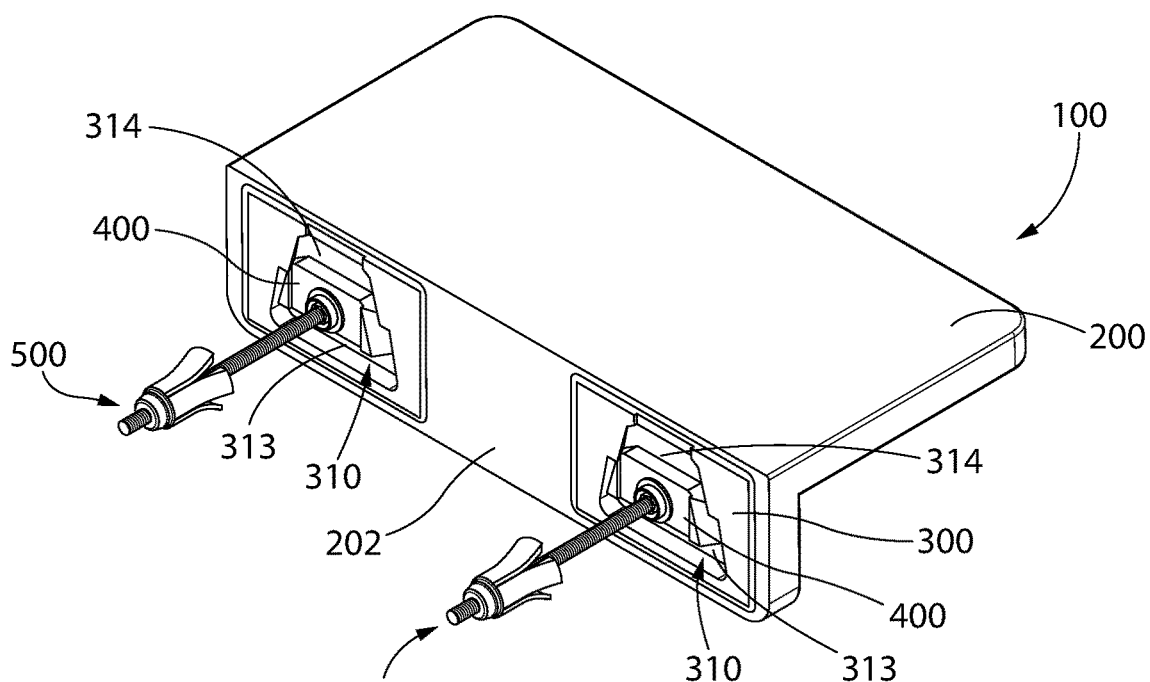
FIGS. 8B and 8C illustrate the mounting brackets being slidably coupled to the mounting brackets of the wall-mountable assembly.
Figure 8C:
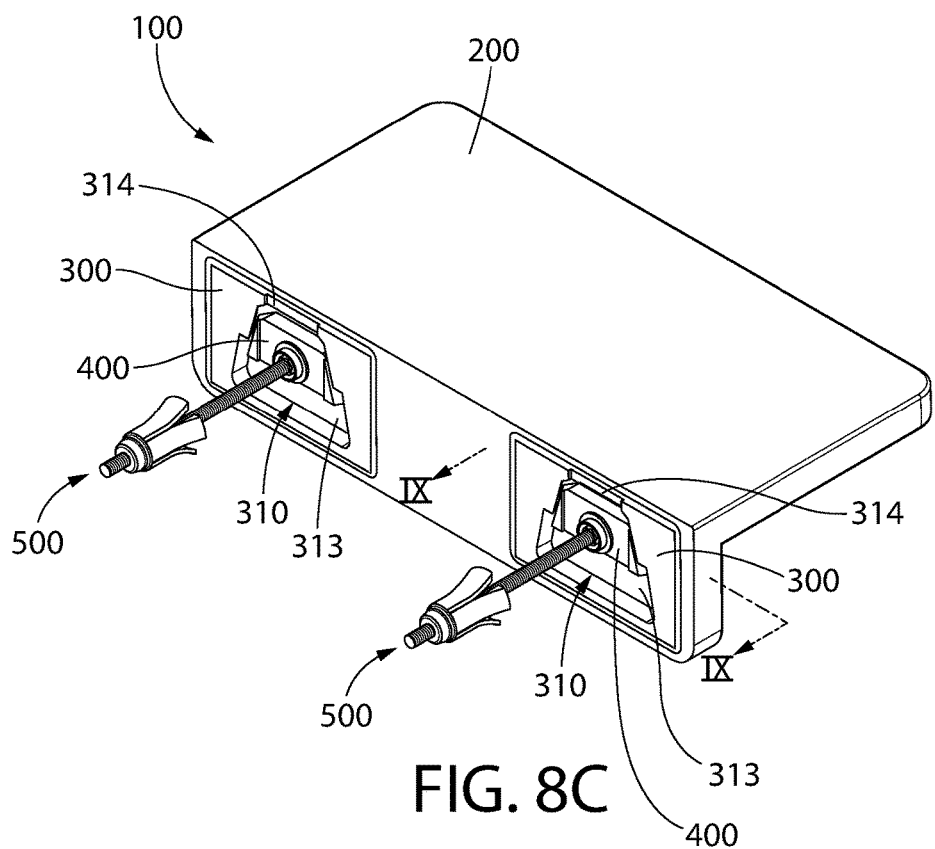

FIGS. 8A-8C illustrate the mounting of the wall-mountable assembly 100 to the mounting bracket 400. In these views, the mounting surface (or wall) is not depicted, but it should be appreciated that the portions of the fasteners 500 which protrude from the rear surface 402 of the mounting bracket 400 would be embedded within the mounting surface or wall and the rear surface 402 of the mounting bracket 400 (at least any portions that are not recessed) would be in abutting contact with the outer surface of the mounting surface or wall. In FIG. 8A, the wall-mountable assembly 100 is positioned with the rear surface 202 of the article 200 and hence also the mounting components 300 coupled thereto positioned adjacent to the mounting brackets 400 which are mounted to a mounting surface or wall (although the mounting surface or wall is not shown in these views, as noted above). Next, as shown in FIG. 8B, the wall-mountable assembly 100 is moved towards the mounting brackets 400 until each of the mounting brackets 400 nests within the insertion region 313 of the mounting channel 310 of one of the mounting components 310 which was previously coupled to the article 200.

Finally, as shown in FIG. 8C, the wall-mountable assembly 100 is translated downwardly relative to the mounting brackets 400. This results in the mounting components 300 sliding relative to the mounting brackets 400 for a slidable engagement between the mounting components 300 and the mounting brackets 400. This downward translation (or sliding) of the wall-mountable assembly 100 relative to the mounting brackets 400 causes the mounting brackets 400 to move upwardly within the mounting channels 310 from the insertion region 313 thereof to the nesting region 314 thereof. Of course, the mounting brackets 400 are mounted to the mounting surface so they do not actually move, but their movement is relative to the wall-mountable assembly 100 as the wall-mountable assembly is translated downwardly. As the mounting brackets 400 slide within the nesting region 314 of the mounting channels 310, the sidewalls 312 of the mounting channels 310 engage and contact the first and second engagement surfaces 410, 420 of the mounting brackets 400. Moreover, owing to the first and second engagement surfaces 410 being angled in two directions as noted above (between the top/bottom surfaces and between the front/rear surfaces), the fit between the mounting bracket 400 and the mounting component 300 becomes tighter as the mounting brackets 400 slide further upwardly within the mounting channels 310.

Figure 9:
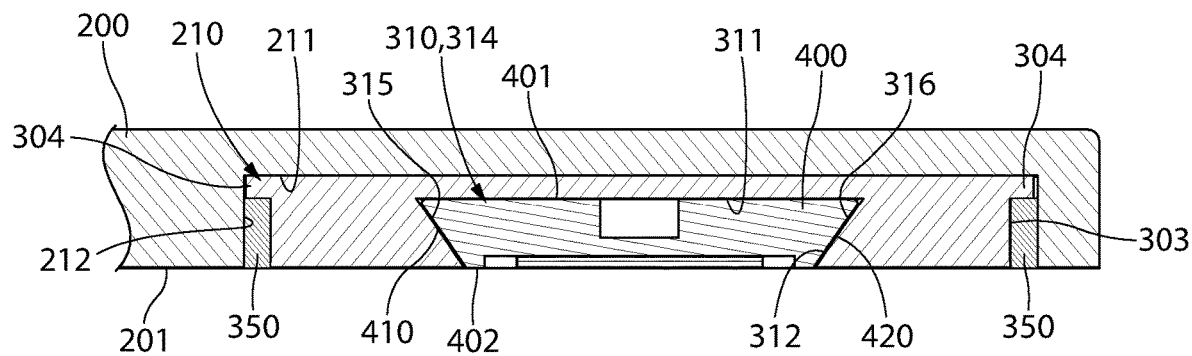
FIG. 9 is a cross-sectional view taken along line IX-IX of FIG. 8C.

FIG. 9 is a cross-sectional view illustrating the engagement of the first and second engagement surfaces 410, 420 of the mounting brackets 400 with the first and second portions 315, 316 of the sidewall 312 of the mounting channel 310 of the mounting components 300 along the nesting region 314 of the mounting channel 310. The engagement surfaces 410, 420 of the mounting brackets 400 are in intimate contact with the first and second portions 315, 316 of the sidewall 312 of the mounting channel 310 of the mounting components 300. As can be appreciated, this prevents the wall-mountable assembly 100 from being able to be detached from the mounting brackets 400 simply by pulling the wall-mountable assembly 100 in a direction perpendicular to the mounting surface (i.e., wall). Rather, the wall-mountable assembly 100 first needs to be translated upwardly relative to the mounting brackets 400 to move the mounting brackets 400 from the nesting regions 314 of the mounting channels 310 to the insertion regions 313 of the mounting channels 310, and then the wall-mountable assembly 100 can be pulled away from the mounting surface or wall.

Figure 10:
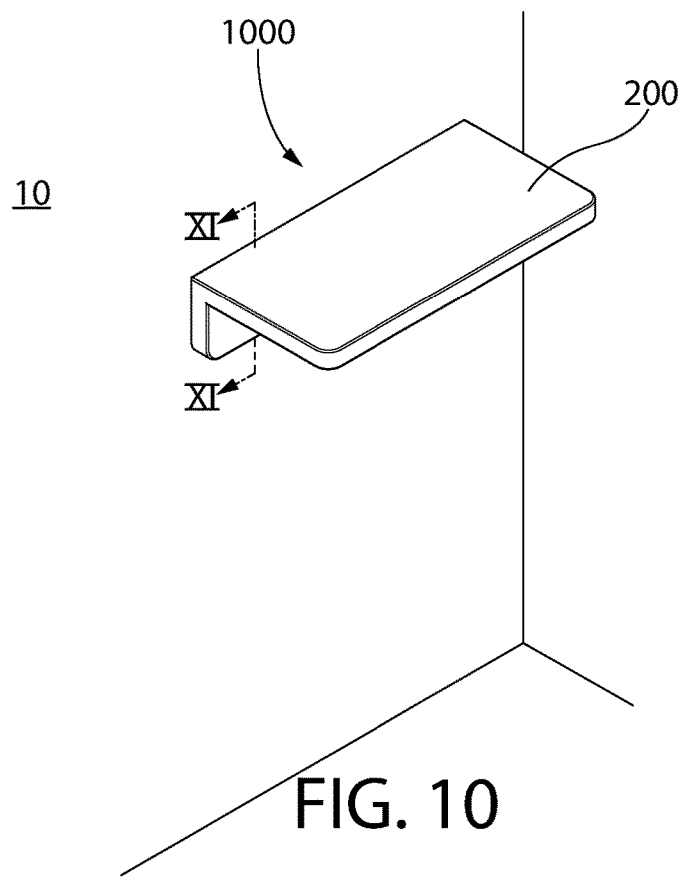
FIG. 10 is a perspective view illustrating the wall mounting apparatus mounted to a wall.
Figure 11:
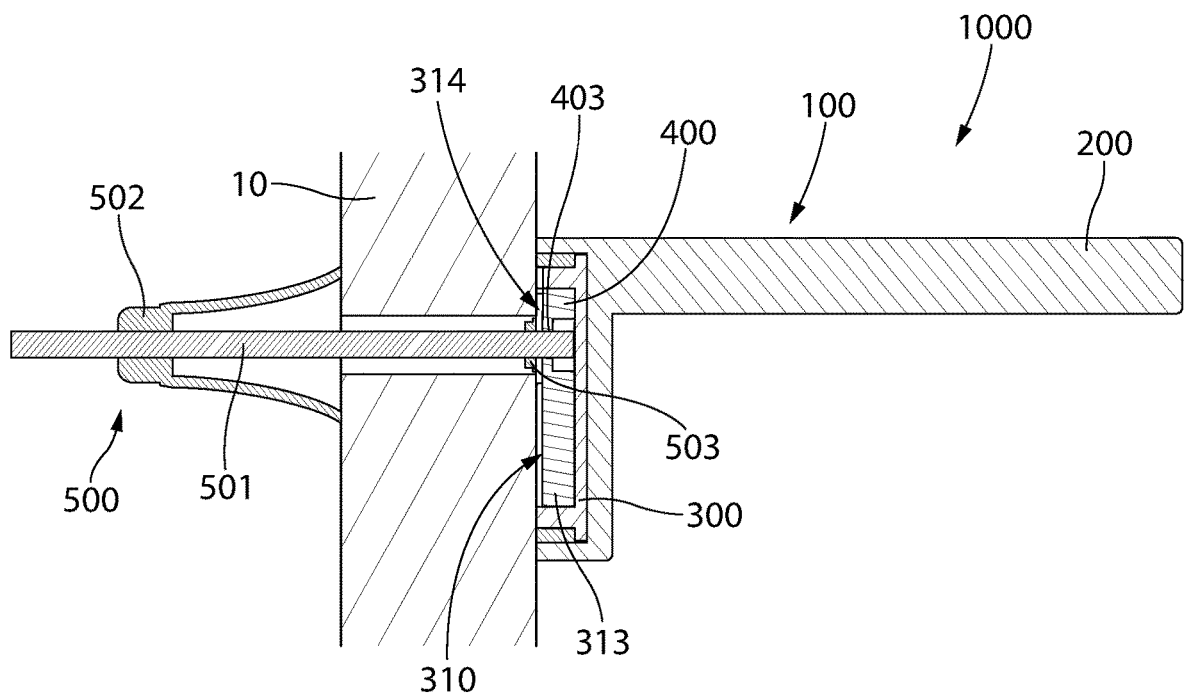
FIG. 11 is a cross-sectional view taken along line XI-XI of FIG. 10.

FIGS. 10 and 11 illustrate the wall mounting apparatus 1000 mounted on a wall 10. As noted previously, the mounting bracket 400 is mounted to the wall 10 with the fastener 500. In particular, the threaded screw 501 of the fastener 500 extends through the through-hole 403 in the mounting bracket 400 and into and through a hole in the wall 10. The fastener member 502 abuts against the non-exposed rear surface of the wall 10 so that the wall 10 is compressed or held under compression between the fastener member 502 and the mounting bracket 400. There may also be a nut 503 (also depicted in FIG. 1) for preventing the threaded screw 501 from being pulled through the through-hole 403. Alternatively, the threaded screw 501 may have a head portion that abuts against the front surface 401 of the mounting bracket 400.

As can be appreciated from FIG. 11, moving the wall-mountable assembly 100 which comprises the article 200 and the mounting component 300 upwardly will cause the mounting bracket 400 to move downwardly (relative to the wall-mountable assembly 100, the mounting bracket 400 is fixed to the wall 10 and will not move relative to the wall 10) from the nesting region 314 of the mounting channel 310 to the insertion region 313 of the mounting channel 310, at which point the wall-mountable assembly 100 can be pulled away from the wall. Moreover, mounting the wall-mountable assembly 100 to the mounting brackets 400 which are pre-mounted on the wall 10 with the fasteners 500 may comprise aligning the mounting brackets 400 with the insertion regions 313 of the mounting channels 310, moving the wall-mountable assembly 100 towards the wall 100 until the mounting brackets 400 are positioned within the insertion regions 313 of the mounting channels 310, and then moving the wall-mountable assembly 100 downwardly relative to the mounting brackets 400 so that the mounting brackets 400 slide from the insertion regions 313 of the mounting channels 310 into the nesting regions 314 of the mounting channels 310.

Figure 12:
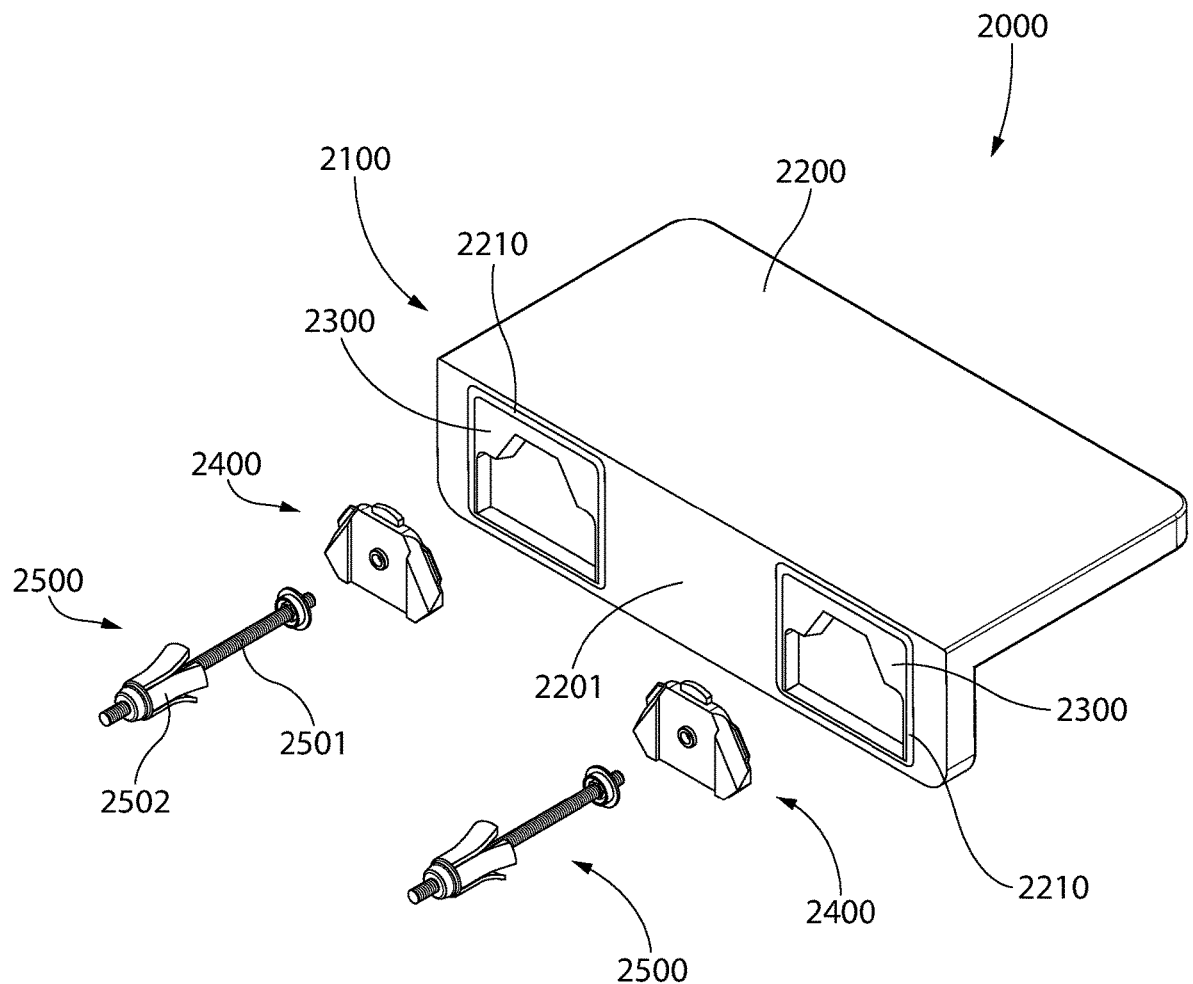
FIG. 12 is an exploded view of a wall-mountable apparatus in accordance with another embodiment of the present invention.

Referring to FIGS. 12-16, a wall mounting apparatus 2000 and various portions thereof are illustrated in accordance with another embodiment of the present invention. Referring first to FIG. 12, the wall mounting apparatus 2000 may comprise a wall-mountable assembly 2100 and at least one mounting bracket 2400. In the exemplified embodiment, there are two of the mounting brackets 2400, although the invention is not to be so limited and there may be a single mounting bracket 2400 or more than two mounting brackets 2400 in other embodiments. The wall-mountable assembly 2100 may comprise an article 2200 and at least one mounting component 2300 that is fixedly coupled to the article 2200. The mounting component 2300 may be a separate and distinct component from the article 2200 and may even be formed from a different material than the article 2200 as herein. The mounting component 2300 may be fixedly coupled to the article 2200 to form the wall-mountable assembly 2100. The mounting component 2300 may then be mounted to the mounting brackets 2400 to mount the wall-mountable assembly 2100 to a wall.

In the exemplified embodiment, there are two of the mounting components 2300. However, the invention is not to be so limited and there may be a single mounting component 2300 or more than two mounting components 2300 in other embodiments. The number of the mounting brackets 2400 may be the same as the number of the mounting components 2300 in some embodiments. In some embodiments, the mounting component 2300 and the mounting bracket 2400 may be referred to collectively as a mounting system because the mounting component 2300 and the mounting bracket 2400 interact with one another to mount or hang the article 2200 from a surface such as a wall. Specifically, the mounting bracket 2400 may first be mounted to a mounting surface such as a wall, and then the mounting components 2300 of the wall-mountable assembly 2100 may be brought into slidable engagement with the mounting brackets 2400 to mount the wall-mountable assembly 2100 to the mounting brackets 2400, and hence also to the mounting surface.

Also depicted in FIG. 12 are a pair of fasteners 2500. Each of the fasteners 500 may be configured to couple one of the mounting brackets 2400 to a mounting surface, which may be a wall within an interior space. However, the mounting surface may be other surfaces, such as the outer surface of a cabinet or the like. In the exemplified embodiment, each of the fasteners 500 comprises a threaded screw member 2501 and a fastener member 2502 which is threadedly coupled to the threaded screw member 501. The details of the fastener 500 described above are applicable to the fastener 2500 and thus additional description of the fastener 2500 will not be provided here in the interest of brevity.

Many features of the wall mounting apparatus 2000 are the same as the features of the wall mounting apparatus 1000 described above. Some modifications have been made to the mounting bracket 2400 and to the mounting component 2300 and those modifications will be described in detail. However, for all other details the description of the wall mounting apparatus 1000 provided above is applicable to the wall mounting apparatus 2000 shown in FIGS. 12-16. This includes manufacturing techniques and methods, materials for each of the components, assembly, installation, wall-mounting process and methods, and the like.

The wall-mountable assembly 2100 may comprise the article 2200 and at least one of the mounting components 2300, which may be separate components (i.e., the mounting components 2300 are not integrally formed with the article 2200, but may be coupled thereto as described herein to form the wall-mountable assembly 2100). In the exemplified embodiment, the article 2200 is a shelf or a ledge. However, the invention is not to be so limited in all embodiments and the article 2200 may take on other forms, such as being other décor items configured for hanging on a wall, such as a cabinet, a bathroom accessory, a frame, a mirror, or the like. The article 2200 may be formed from a brittle material, as defined above. In some embodiments, the brittle material may be a solid surface material as that allows the article 2200 to be formed in essentially infinite colors and design configurations. The brittle material may be other materials such as those noted above.

The article 2200 may comprise a rear surface 2201 that is configured to abut against the mounting surface (e.g., the wall) when the article 2200 is mounted thereon. The article 2200 may comprise at least one recess 2210 within which the mounting components 2300 are disposed when the mounting components 2300 are coupled to the article 2200. The exemplified embodiment depicts two recesses 2210 and two of the mounting components 2300, but the invention is not to be limited to the number of recesses and mounting components shown in the exemplified embodiment. The mounting components 2300 may be coupled to the article 2200 in the same manner as described above (e.g., with the use of a bonding agent like an epoxy adhesive). The description above with regard to the manner of coupling the mounting components 300 to the article 200 is completely applicable to the manner of coupling the mounting components 2300 to the article 2200.

The main difference between the wall mounting apparatus 2000 and the wall mounting apparatus 1000 previously described has to do with certain structural modifications to the mounting brackets 2400 and the mounting components 2300. These structural modifications will be described herein below.

Figure 13A:
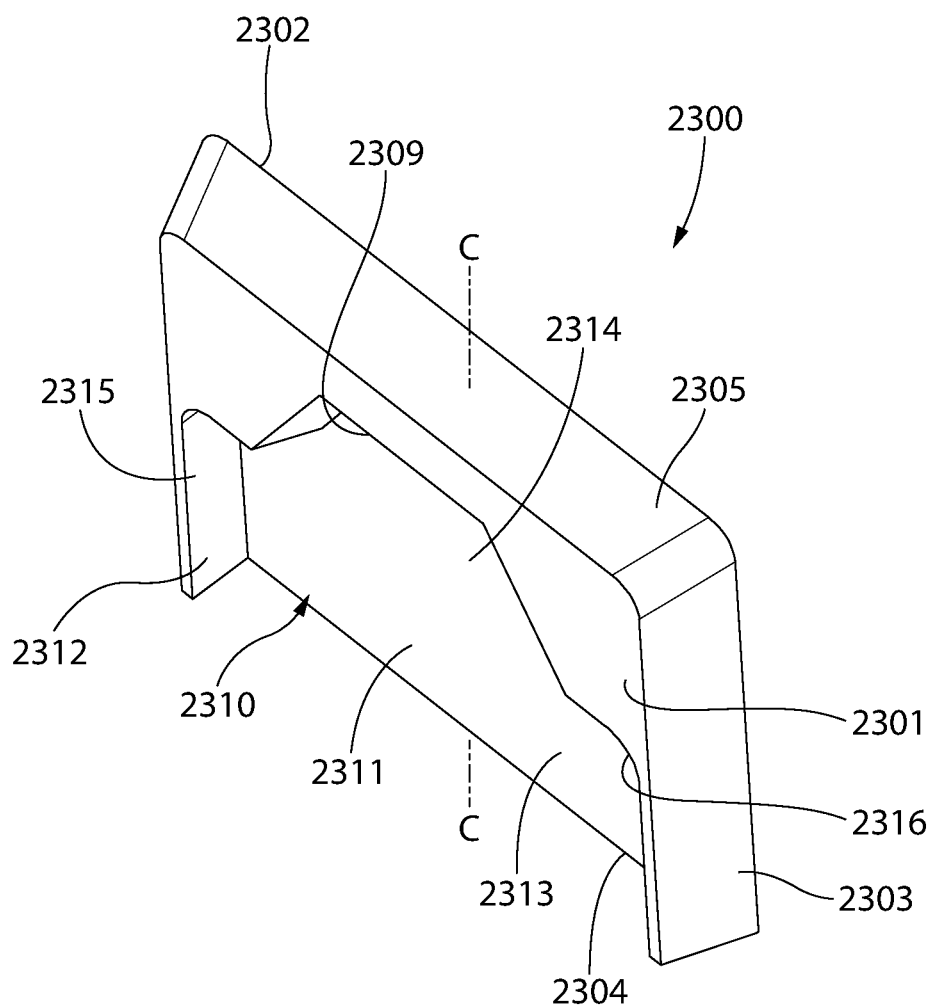
FIGS. 13A-13C are perspective views of a mounting component of the wall mounting apparatus of FIG. 12.
Figure 13B:
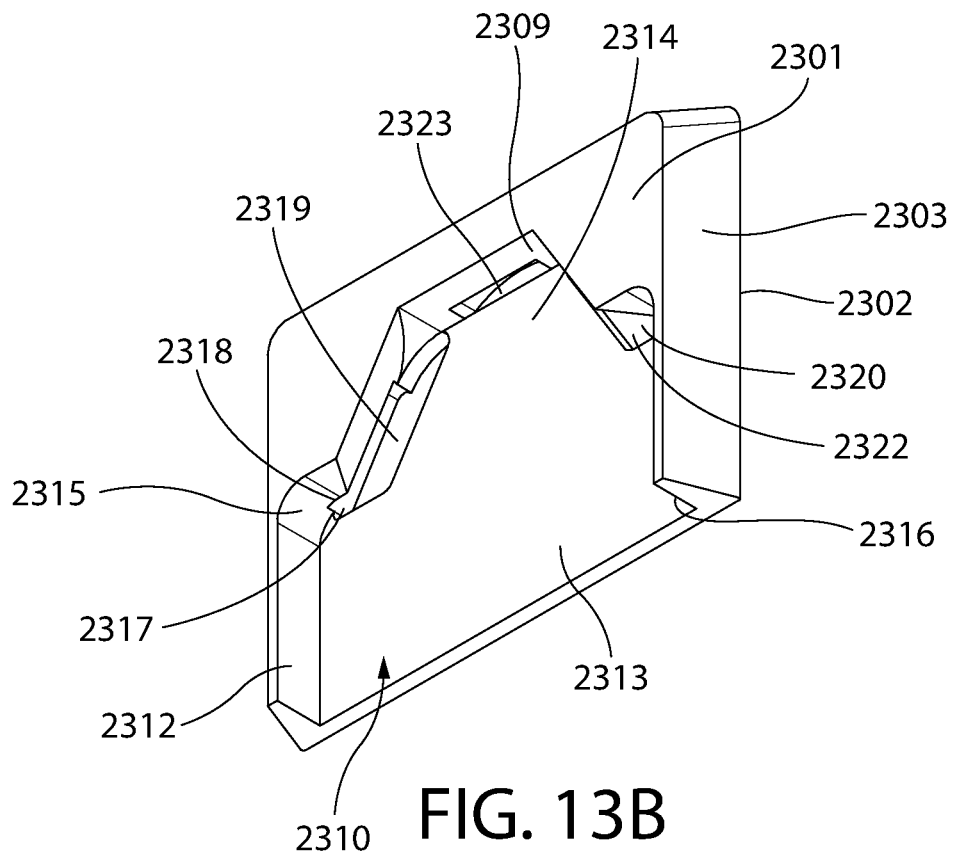
Figure 13C:
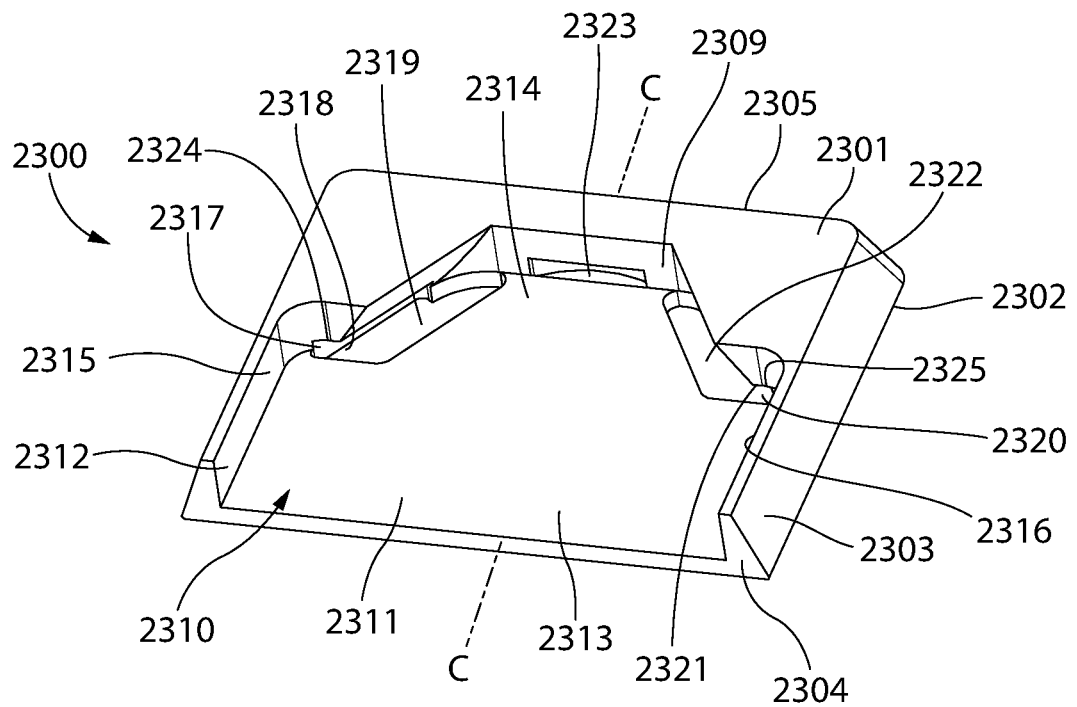
Figure 14A:
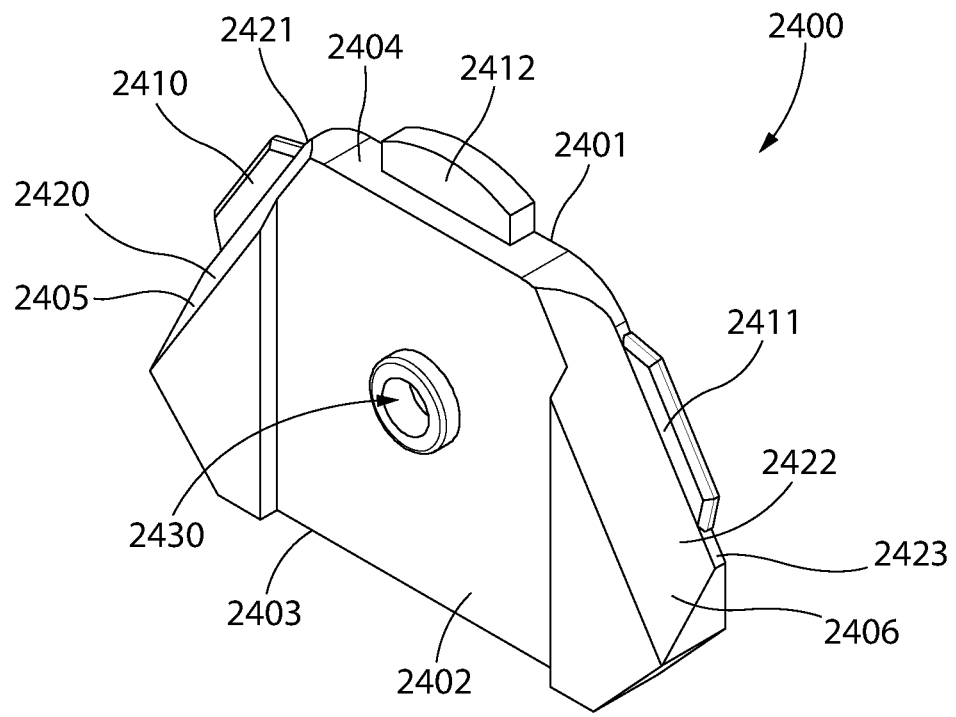
FIGS. 14A-14D are perspective, front, rear, and top views of a mounting bracket of the wall mounting apparatus of FIG. 12.
Figure 14B:
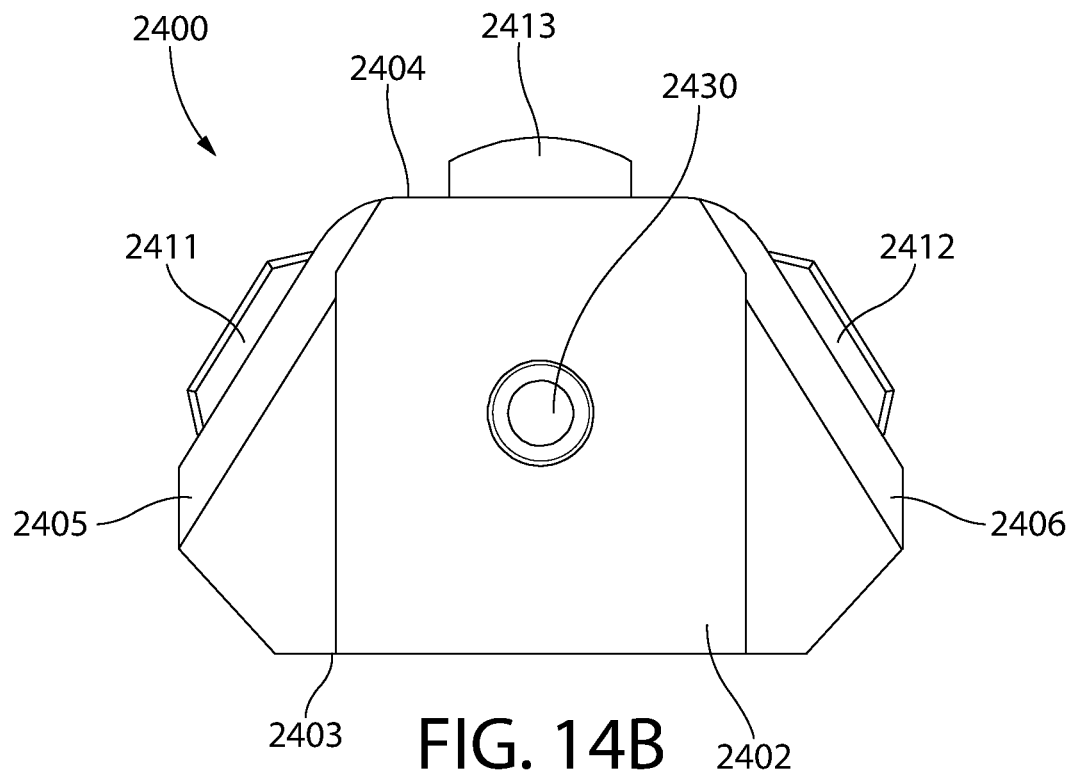
Figure 14C:
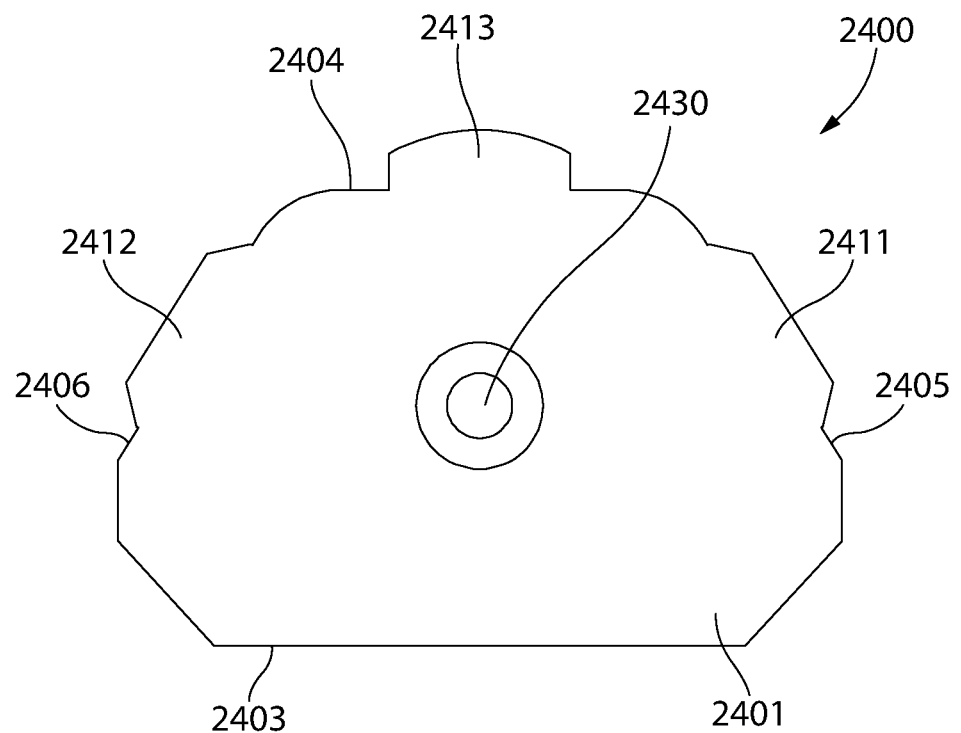
Figure 14D:
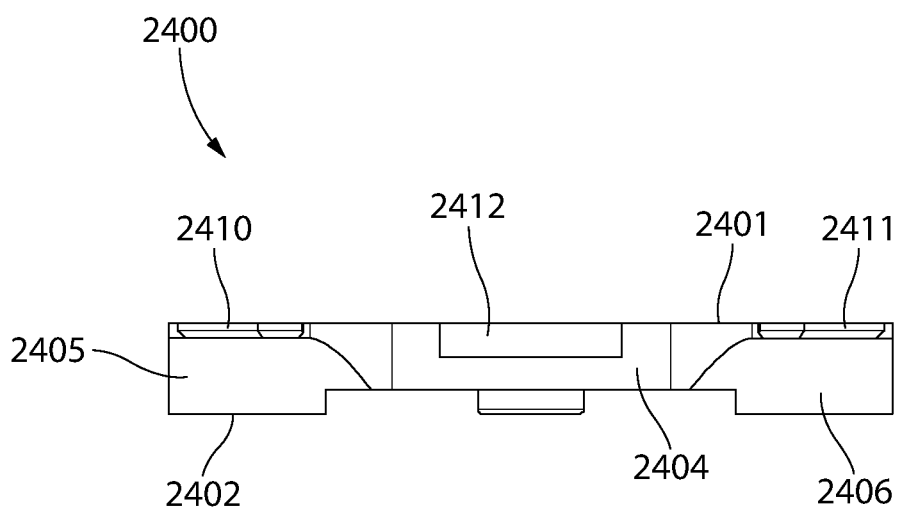

Referring to FIGS. 13A-13C, the mounting components 2300 will be described. The mounting components 2300 may be formed from metal, plastic, or the like as described above with reference to the mounting components 300. The mounting components 2300 comprise a front surface 2301, a rear surface 2302, and a peripheral surface 2303 extending between the front and rear surfaces 2301, 2302. In the exemplified embodiment, the front and rear surfaces 2301, 2302 are planar and parallel to one another, and the peripheral surface 2303 is beveled so that it is angled or sloped outwardly moving in a direction from the front surface 2301 to the rear surface 2302. When the mounting component 2300 is positioned within the recess 2210 in the rear surface 2201 of the article 2200, a gap exists between the peripheral surface 2303 and the wall which surrounds the recess 2210. The bonding agent (i.e., epoxy adhesive or the like) may be introduced into the gap between the peripheral surface 2303 of the mounting component 2300 and the wall of the recess 2210 of the article 2200 to attach to the mounting component 2300 to the article 2200. While the mounting components 2300 do not have a flange as with the prior embodiment of the mounting components 300, the beveled peripheral surface 2303 will facilitate the attachment via the bonding agent and achieves the same retention function as the flange in the prior embodiment.

The mounting component 2300 may also comprise a mounting channel (or mounting recess) 2310 that is formed into the front surface 2301 of the mounting component 2300. The mounting channel 2310 may be a recess that is formed into the front surface 2301 of the mounting component 2300. The mounting channel 2310 may be defined by a floor 2311 that is recessed relative to the front surface 2301 of the mounting component 2300 and a sidewall 2312 that extends from the floor 2311 to the front surface 2301 of the mounting component 2300. In other embodiments, the mounting channel 2310 may not comprise a floor, and in such embodiments the mounting channel 2310 may be a through-hole or aperture in the mounting component 2300 which extends from the front surface 2301 to the rear surface 2302. In such embodiments, the mounting channel 2310 may be defined solely by the sidewall 2312 which may extend the full depth between the front and rear surfaces 2301, 2302.

The mounting component 2300 may comprise a bottom edge 2304 and a top edge 2305. The mounting channel 2310 may be open at the bottom edge 2304 but may not extend all the way to the top edge 2305. The mounting channel 2310 may comprise a longitudinal axis C-C extending in a direction between the bottom and top edges 2304, 2305. The sidewall 2312 may comprise a first portion 2315 located on a first side of the longitudinal axis C-C, a second portion 2316 located on a second side of the longitudinal axis C-C, and a top portion 2309. The mounting channel 2310 may comprise an insertion region 2313 and a nesting region 2314. The insertion region 2313 extends from the bottom end 2304 to a transition location, the transition location being where the width of the mounting channel 2310 measured between the first and second portions 2315, 2316 of the sidewall 2312 begins to decrease. The nesting region 2314 extends from the transition region to a top end of the mounting channel 2310. Along the insertion region 2313, the sidewall 2312 may extend perpendicular from the floor 2311 and the first and second portions 2315, 2316 of the sidewall 2312 may be oriented parallel to one another. Along the nesting region 2314, the sidewall 2312 may be oriented at an acute angle relative to the floor 2311. That is, at any given location along the first and second portions 2315, 2316 of the sidewall 2312 within the nesting region 2314, the distance between the first and second portions 2315, 2316 of the sidewall 2312 increases moving from the front surface 2301 of the mounting component 2300 towards the rear surface 2302 of the mounting component 2300 (or towards the floor 2311). Furthermore, along the nesting region 2314 the first and second portions 2315, 2316 of the sidewall 2312 may be angled so as to converge towards one another moving in a direction from the insertion region 2313 towards the top edge 2305. Thus, the first and second portions 2315, 2316 of the sidewall 2312 may be angled inwardly towards the longitudinal axis C-C and may be angled in a direction between the front and rear surfaces 2301, 2302.

Along the nesting region 2314, the first portion 2315 of the sidewall 2312 comprises a first elongated notch 2317 that extends from the transition location towards the top portion 2309 of the of the sidewall 2312 (which defines the top end of the mounting channel 2310). The first elongated notch 2317 extends between a bottom edge 2318 of the first portion 2315 of the sidewall 2312 along the nesting region 2314 of the mounting channel 2310 and the floor 2311 of the mounting channel 2310. Thus, the bottom edge 2318 of the first portion 2315 of the sidewall 2312 along the nesting region 2314 of the mounting channel 2310 may be elevated above the floor 2311 of the mounting channel 2310 to form a space (i.e., the notch 2317). A horizontal locking wall 2324 may extend from the first portion 2315 of the sidewall 2312 along the nesting region 2314 with the horizontal locking wall 2324 forming an upper boundary of the notch 2317. The horizontal locking wall 2324 may be oriented generally parallel to the floor 2311. There may be a hole 2319 in the floor 2311 of the mounting channel 2310 just below the first elongated notch 2317, although the hole 2319 may be omitted in some embodiments.

Along the nesting region 2314, the second portion 2316 of the sidewall 2312 comprises a second elongated notch 2320 that extends from the transition location towards the top portion 2309 of the sidewall 2312. The second elongated notch 2320 extends between a bottom edge 2321 of the second portion 2316 of the sidewall 2312 along the nesting region 2314 of the mounting channel 2310 and the floor 2311 of the mounting channel 2310. Thus, the bottom edge 2321 of the second portion 2316 of the sidewall 2312 along the nesting region 2314 of the mounting channel 2310 may be elevated above the floor 2311 of the mounting channel 2310 to form a space (i.e., the notch 2318). A horizontal locking wall 2325 may extend from the second portion 2316 of the sidewall 2312 along the nesting region 2314 with the horizontal locking wall 2325 forming an upper boundary of the notch 2320. The horizontal locking wall 2325 may be oriented generally parallel to the floor 2311. There may be a hole 2322 in the floor 2311 of the mounting channel 2310 just below the second elongated notch 2320, although the hole 2322 may be omitted in some embodiments.

A third notch 2323 may formed into the top portion 2309 of the sidewall 2312. The third notch 2323 may extend along a central portion of the top portion 2309 of the sidewall 2312 or along an entirety of the top portion 2309 of the sidewall 2312.

As noted above, the mounting component 2300 is mounted to the article 2200 in the same manner as described above with reference to the mounting component 300 and the article 200. That is, the mounting component 2300 is inserted into the mounting recess 2210 in the rear surface 2201 of the article 2200 and then bonded thereto using an bonding agent such as an epoxy, an adhesive, or the like. This process fixedly couples the mounting component(s) 2300 to the article 2200 so that the mounting components 2300 can engage with the mounting brackets 2400 to hang the wall-mountable assembly 2100 on a wall or other surface.

Referring to FIGS. 14A-14D, the mounting bracket 2400 will be described. The mounting bracket 2400 is similar to the mounting bracket 400 described above, except it includes additional tab features which are intended to nest within the first, second, and third notches 2317, 2320, 2323 of the mounting component 2300. These tab features prevent the canted surfaces of the mounting bracket 2400 and mounting component 2300 from sliding on each other and prevent the article 2200 from loosening with directional movement.

The mounting bracket 2400 comprises a front surface 2401, a rear surface 2402, a bottom edge 2403, a top edge 2404, a first side edge 2405 extending from the bottom edge 2403 to the top edge 2404, and a second side edge 2406 extending from the bottom edge 2403 to the top edge 2404. The first and second side edges 2405, 2406 may form engagement surfaces of the mounting bracket 2400, similar to the engagement surfaces 410, 420 of the mounting bracket 400 described above. The outer surfaces of the first and second side edges 2405, 2406 may be canted. More specifically, the outer surfaces of the first and second side edges 2405, 2406 may be sloped or angled relative to the front and rear surfaces 2401, 2402. In particular, the outer surfaces of the first and second side edges 2405, 2406 may be angled outwardly when moving in a direction from the rear surface 2402 to the front surface 2401. The angle or slope of the outer surfaces of the first and second side edges 2405, 2406 is intended to correspond to the angle or slope of the first and second portions 2315, 2316 of the sidewall 2312 of the mounting component 2300 along the nesting region 2314 thereof to facilitate engagement between the mounting components 2300 and the mounting brackets 2400. The first and second side edges 2405, 2406 may also be angled so as to converge moving in a direction from the bottom edge 2403 towards the top edge 2402, for at least a portion of the length of the first and second side edges 2405, 2406. That is, the first and second side edges 2405, 2406 may be angled towards one another moving from the bottom edge 2403 towards the top edge 2402

The mounting bracket 2400 may comprise a first tab 2410 protruding from the first side edge 2405, a second tab 2411 protruding from the second side edge 2406, and a third tab 2412 protruding from the top edge 2404. In particular, in the exemplified embodiment the first side edge 2405 comprises a canted (or angled) portion 2420 adjacent to the rear surface 2402 and a flat portion 2421 adjacent to the front surface 2401. Similarly, the second side edge 2406 comprises a canted (or angled) portion 2422 adjacent to the rear surface 2402 and a flat portion 2423 adjacent to the rear surface 2402. The first and second flat portions 2421, 2423 may be oriented perpendicular to the front/rear surfaces 2401, 2402. The first tab 2410 may protrude from the flat portion 2421 of the first side edge 2405 and the second tab 2411 may protrude from the flat portion 2423 of the second side edge 2406. The first and second tabs 2410, 2411 are oriented at an angle that matches the angle of the one of the first and second side edges 2405, 2406 from which it extends. In some embodiments, the flat portions 2421, 2423 may be omitted and the tabs 2410, 2411 may protrude directly from the angled portions 2420, 2422.

The mounting bracket 2400 may also comprise an aperture 2430 extending from the front surface 2401 to the rear surface 2402. The aperture 2430 may be configured to receive one of the fasteners 2500 for purposes of mounting the mounting bracket 2400 to a wall or other mounting surface.

Figure 15:
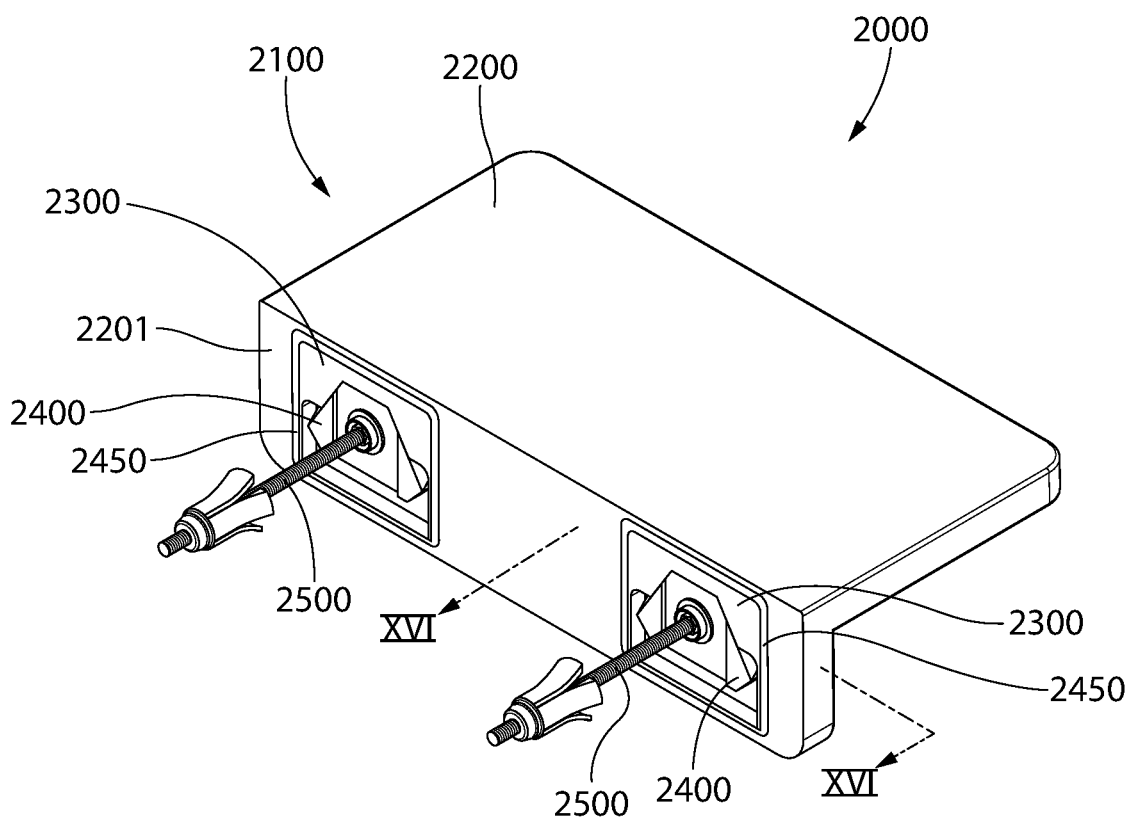
FIG. 15 is a perspective view of the wall-mountable apparatus of FIG. 12 in an assembled state whereby the mounting components are engaged with the mounting brackets.
Figure 16:
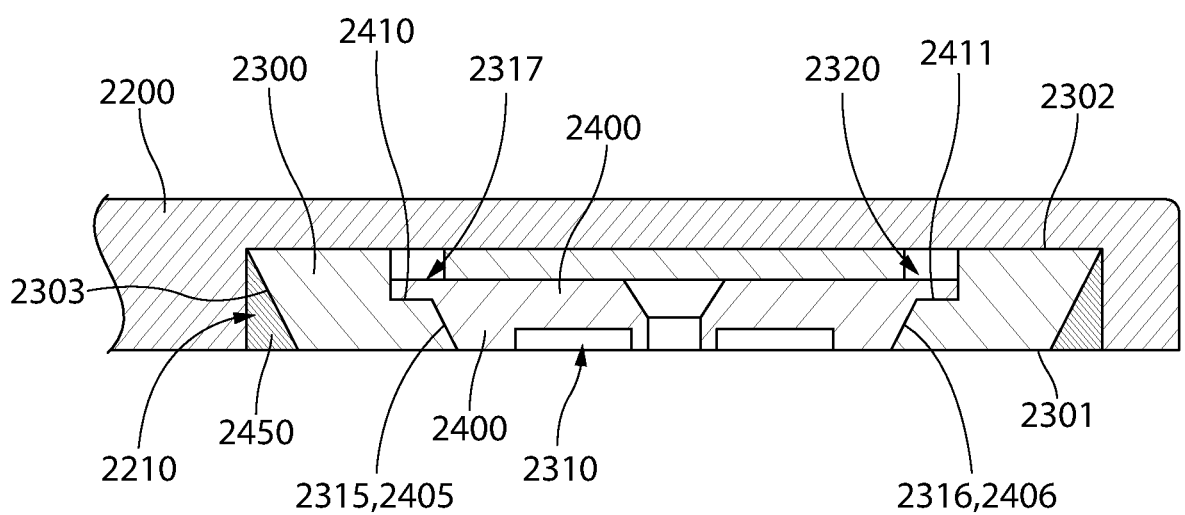
FIG. 16 is a cross-sectional view taken along line XVI-XVI of FIG. 15.

FIG. 15 illustrates the wall mounting apparatus 2000 in a fully assembled state and FIG. 16 is a cross-sectional view through the article 2200, the mounting component 2300, and the mounting bracket 2400 to illustrate the interlocking relationship between the mounting component 2300 and the mounting bracket 2400. First, as noted above, the bonding agent 2450 is illustrated in FIG. 16 filling in the gap between the peripheral edge 2303 of the mounting component 2300 and the inner surface of the article 2200 which defines the mounting recess 2210. The aspect of the invention has been described in detail above with regard to the wall mounting apparatus 1000 and that description is applicable to the wall mounting apparatus 2000 despite the minor difference in contour/shape of the various components.

As with the prior embodiment, the mounting brackets 2400 are first mounted onto the wall or other surface upon which the wall-mountable assembly 2100 is to be mounted. The wall-mountable assembly 2100 is assembled by affixing the mounting components 2300 to the article 2200 in the manner described herein. The rear surface 2201 of the article 2200 is then positioned facing the mounting brackets 2400 and the article 2200 is moved towards the mounting brackets 2400 until the mounting brackets 2400 nest within the insertion regions 2313 of the mounting channels 2310 of the mounting components 2300. The wall-mountable assembly 2100, which includes the article 2200 and the mounting components 2300, are then slid downwardly relative to the mounting brackets 2400 which causes the mounting brackets 2400 to slide from the insertion region 2313 of the mounting channels 2310 of the mounting components 2300 to the nesting region 2314 of the mounting channels 2310 of the mounting components 2300. Once so positioned, the wall-mountable assembly 2100 is robustly mounted to the wall.

As shown in FIG. 16, when the wall-mountable assembly 2100 is mounted to the mounting brackets 2400, the outer surfaces of the first and second side edges 2405, 2406 of the mounting bracket 2400 abut against the first and second portions 2315, 2316 of the sidewall 2312 of the mounting component 2300 along the nesting region 2314. Furthermore, the first tab 2410 of the mounting bracket 2400 nests within the first notch 2317 of the mounting component 2300, the second tab 2411 of the mounting bracket 2400 nests within the second notch 2320 of the mounting component 2300, and the third tab 2412 of the mounting bracket 2400 nests within the third notch 2323 in the mounting component 2300. The third tab 2412 and third notch 2323 are not shown in FIG. 16, but their engagement and relationship should be appreciated from the other figures and the description set forth herein.

Figure 17:
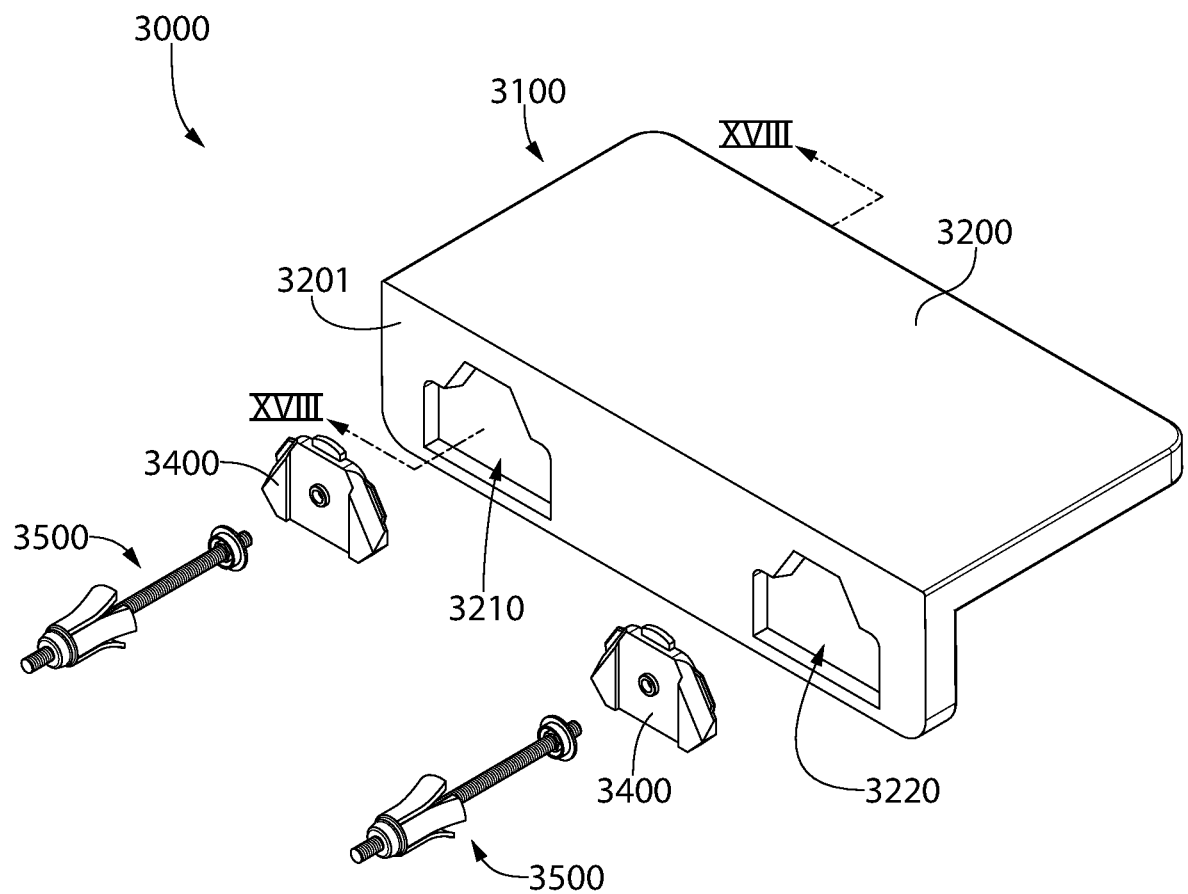
FIG. 17 is an exploded perspective view of a wall mounting apparatus in accordance with another embodiment of the present invention.
Figure 18:
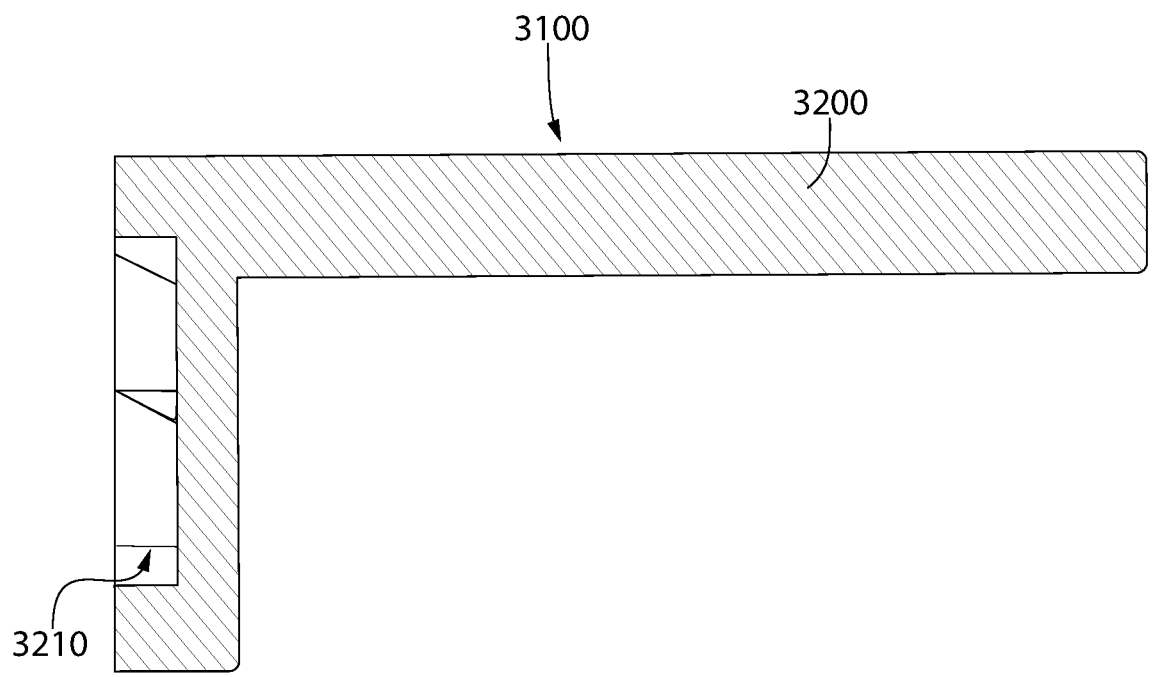
FIG. 18 is a cross-sectional view taken along line XVIII-XVIII of FIG. 17.

Referring to FIGS. 17 and 18, an alternative embodiment of a wall mounting apparatus 3000 is illustrated. The wall mounting apparatus 3000 may generally comprise a wall-mountable assembly 3100, one or more mounting brackets 3400, and one or more fasteners 3500. In this embodiment, the mounting brackets 3400 are identical to the mounting brackets 2400 and the fasteners 3500 are identical to the fasteners 2500. Thus, descriptions of those components will not be provided here, it being understood that reliance on the prior description of the identical components is applicable In this embodiment, the wall-mountable assembly 3100 may comprise an article 3200, which may be a shelf or ledge or any other item such as those described with reference to the previous embodiments. The main difference between this embodiment and those previously described is that in this embodiment the wall-mountable assembly 3100 does not include mounting components which are distinct from the article 3200 and coupled thereto. Rather, in this embodiment the article 3200 comprises a rear surface 3201 comprising a first mounting channel 3210 and a second mounting channel 3220. The article 3200 may be formed from metal in this embodiment instead of solid surface material.

In this embodiment, the first and second channels 3210, 3220 have an identical structure to the mounting channel 2310 of the mounting component 2300. Thus, the idea in this embodiment is that the first and second mounting channels 3210, 3220 are formed as an integral part of the article 3200, rather than the channels being formed into a separate component which is later attached to the article. The mounting brackets 3400 may be configured to be mounted to a wall or other support surface, and to then interlock with features of the first and second mounting channels 3210, 3220 to facilitate attachment of the article 3200 to the mounting brackets 3400 which are mounted on a wall or other support surface.

Figure 19:
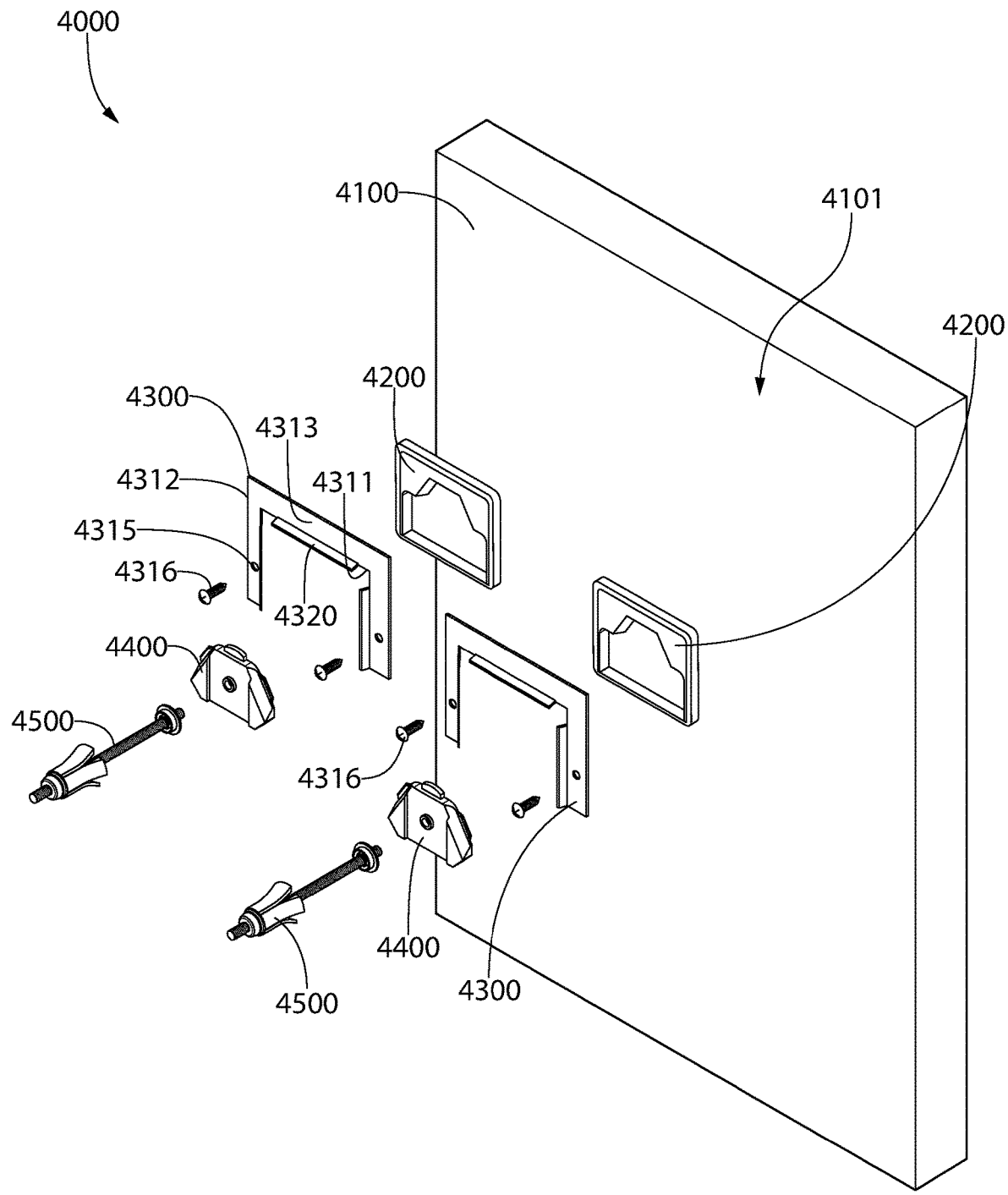
FIG. 19 is an exploded perspective view of a wall mounting apparatus in accordance with another embodiment of the present invention.
Figure 20:
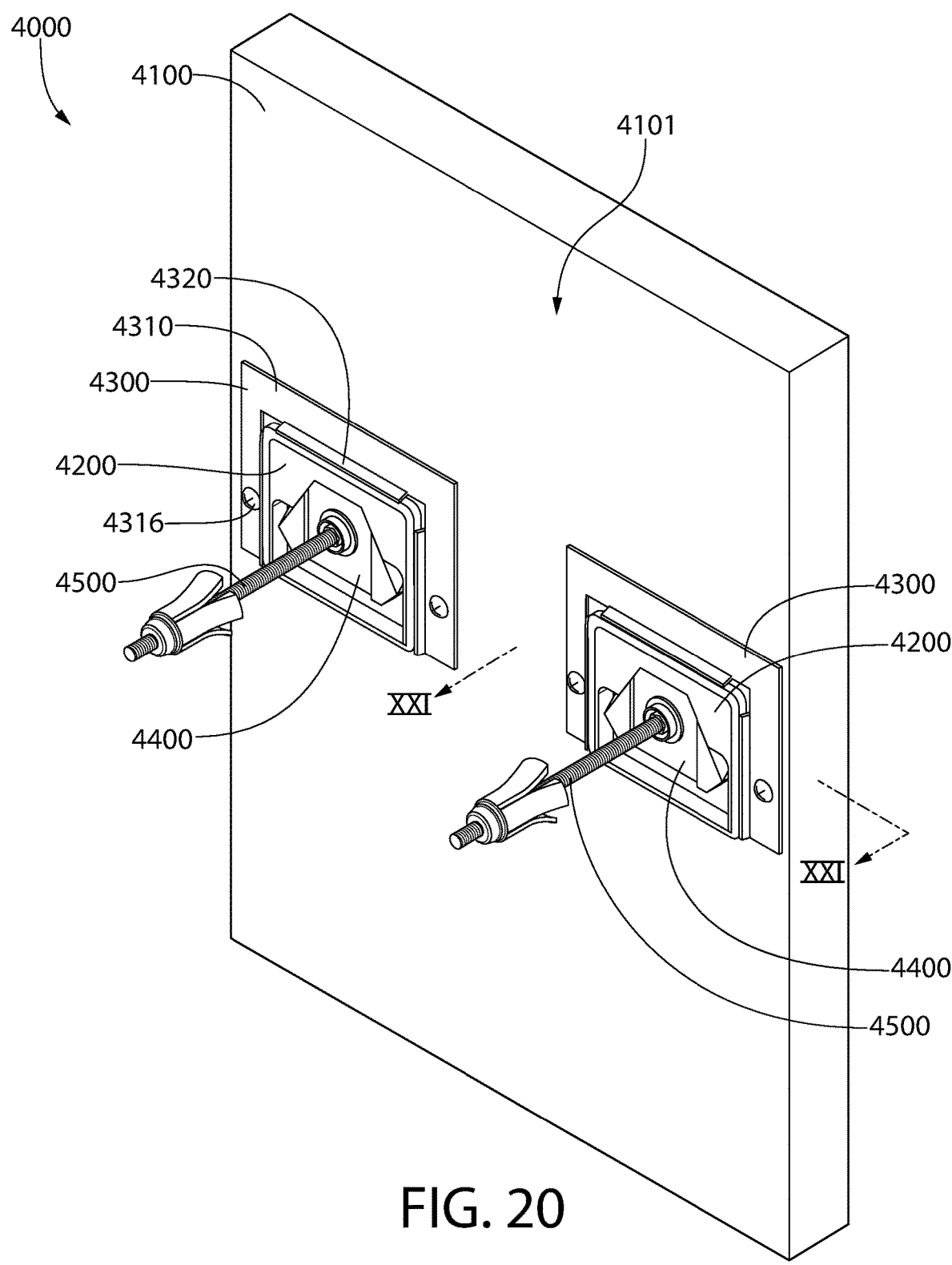
FIG. 20 is an assembled perspective view of the wall mounting apparatus of FIG. 19.
Figure 21:
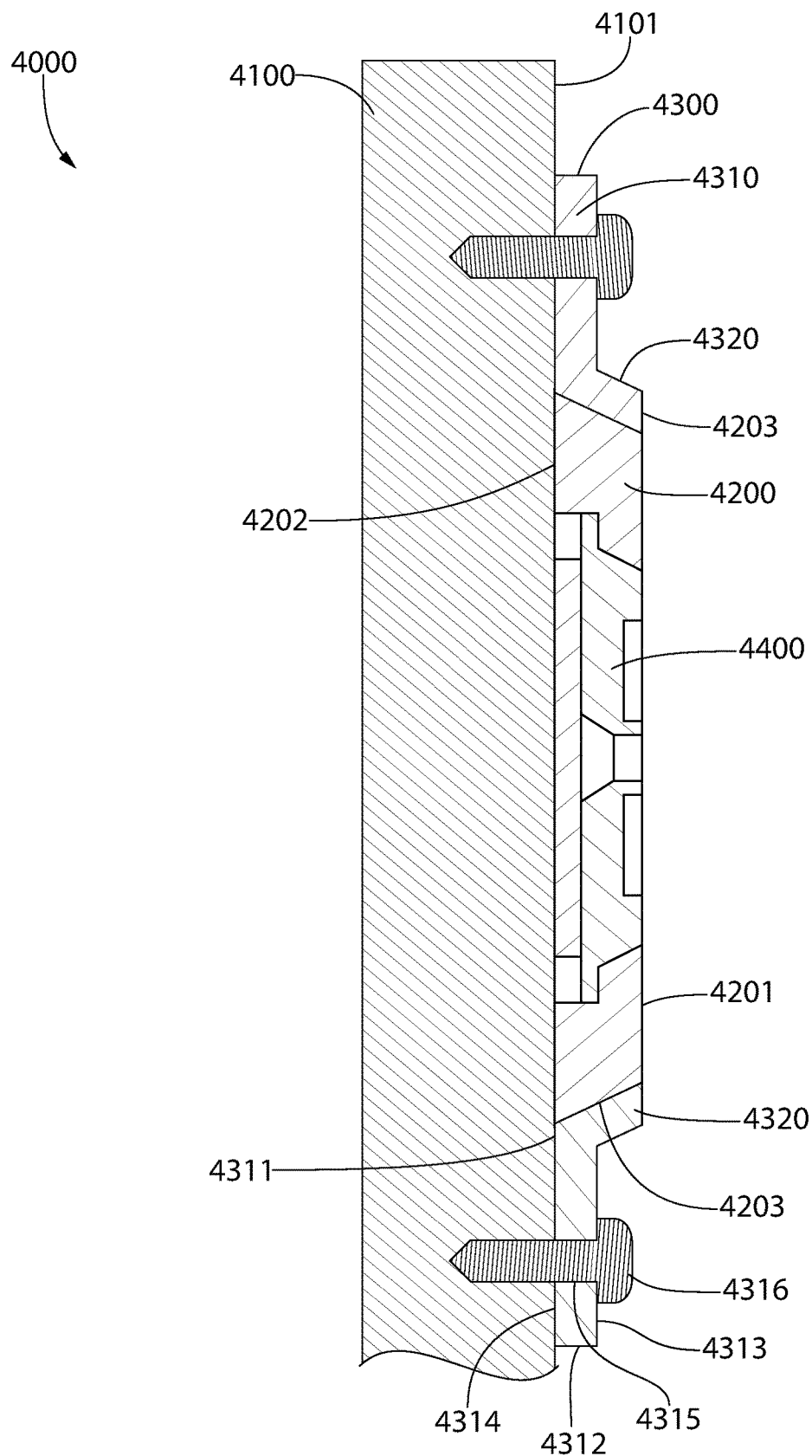
FIG. 21 is a cross-sectional view taken along line XXI-XXI of FIG. 20.

FIGS. 19-21 illustrate yet another embodiment of a wall mounting apparatus 4000. The wall mounting apparatus 4000 may comprise an article 4100 for mounting on the wall, one or more mounting components 4200, one or more attachment brackets 4300, one or more mounting brackets 4400, and one or more fasteners 4500. The article 4100 is illustrated as being a flat panel, but the invention is not to be so limited. The article 4100 may be any article which is desired to be mounted to a wall or other support surface, and may include shelves, ledges, cabinets, mirrors, frames, artistic works, closet systems, and the like, including any additional types of articles mentioned with reference to the previously described embodiments. The article 4100 may be formed from plywood, medium-density fiberboard, particle board, engineered wood, authentic or non-engineered wood, or the like.

The mounting components 4200 are identical to the mounting components 2200 described above and therefore further description of those components will not be provided here, it being understood that the description of the mounting components 2200 is applicable. Similarly, the mounting brackets 4400 are identical to the mounting brackets 2400 described above and therefore further description of those components will not be provided here, it being understood that the description of the mounting components 2400 is applicable. The interaction and engagement between the mounting components 4200 and the mounting brackets 4400 is the same as described above with reference to the mounting components 300 and the mounting brackets 400 and the mounting components 2300 and the mounting brackets. 2400 Finally, the fasteners 4500 may be identical to the fasteners 2500 or may take other forms including any form noted herein, and therefore further details of the fasteners 4500 may be taken from the description provided above.

The differences between this embodiment and the embodiments previously described is as follows. First, in this embodiment the article 4100 may not include a recess within which the mounting component 4200 is positioned. Rather, the article 4100 may have a planar or flat rear surface 4101 on which the mounting components 4200 are configured to be attached. The second difference is that addition of the attachment brackets 4300. The attachment brackets 4300 may be used to attach the mounting components 4200 to the rear surface 4101 of the article 4100. In this embodiment, there is a distinct attachment bracket 4300 for each mounting component 4200, but in other embodiments one attachment bracket 4300 may be used to attach two or more of the mounting components 4200 to the article 4100.

The attachment brackets 4300 may be formed from metal (i.e., aluminum, steel, etc.), although other materials may be used such as hard plastic. The attachment brackets 4300 may comprise a plate portion 4310 that is configured to abut against the rear surface 4101 of the article 4100 when the attachment brackets 4300 are coupled to the article 4101 and one or more flange portions 4320 extending from the plate portion 4310. In the exemplified embodiment, the attachment brackets 4300 are U-shaped having three sides, although the invention is not limited by this specific shape in all embodiments. The plate portion 4310 comprises an inner edge 4311 and an outer edge 4312 that forms a periphery or outer edge of the attachment bracket 4300. The plate portion 4310 further comprises a front surface 4313 and a rear surface 4314. The plate portion 4310 may comprise one or more holes 4315 extending from the front surface 4313 to the rear surface 4314. Fasteners 4316 such as screws or the like may be inserted through the one or more holes 4315 to facilitate the attachment of the attachment brackets 4300 to the rear surface 4101 of the article 4100. That is with the article 4100 formed from a wood material as noted, the fasteners 4316 may be able to penetrate into the article 4100 to secure the attachment of the attachment brackets 4300 to the article 4100. The attachment brackets 4300 may be positioned with their rear surfaces 4314 adjacent to or in abutment with the rear surface 4101 of the article 4100.

The flange portions 4320 extend from the inner edge 4311 of the plate portion 4310. In the exemplified embodiment there are three separate and spaced apart flange portions 4320, but in other embodiments a single continuous flange may be used. The flange portions 4320 may extend obliquely upwardly from the inner edge 4311 in a direction away from the front surface 4313. The angle of the flange portion 4320 may match the angle of the peripheral surface 4203 of the mounting component 4200, as best shown in FIG. 21.

The attachment brackets 4300 are coupled to the article 4100 and function to securely hold the mounting components 4200 in position on the rear surface 4101 of the article 4100. First, the mounting components 4200 are positioned into contact with the rear surface 4101 of the article 4100. In some embodiments, an adhesive may be positioned between the rear surface 4202 of the attachment brackets 4300 and the rear surface 4101 of the article 4100. The adhesive may be glue, epoxy, double-sided tape, or the like as desired. The adhesive may be placed onto the rear surface 4302 of the mounting components 4200, the rear surface 4101 of the article 4100, or both. The adhesive may form a temporary hold between the attachment brackets 4300 and the article 4100.

Next, the attachment brackets 4300 may be positioned so that the plate portion 4310 is in contact with the rear surface 4101 of the article 4100 and the plate portion 4310 surrounds the mounting components 4200 on three sides (although it could be more or less than three sides depending on the shape and structure of the attachment bracket 4300). There may be one attachment bracket 4300 used for each mounting component 4200, or a singular attachment bracket 4300 may be sized to be used with multiple mounting components 4200. With the plate portion 4310 surrounding the mounting component 4200, the flange portion(s) 4320 extend along/adjacent to the peripheral surface 4203 of the mounting components 4200. Due to the angled orientation of the flange portions 4320 and the peripheral surface 4203, the mounting components 4200 are prevented from being removed from the article 4100 without first removing the attachment brackets 4300 from the article 4100.

Then, a screw or other fastener 4316 is inserted through the opening 4315 in the attachment bracket 4300 and into the rear surface 4101 of the article 4100 to securely couple the attachment bracket 4300 to the article 4100. Because the flange portion(s) 4320 extend over the front surface 4201 of the mounting component 4200, the attachment bracket 4300 holds the mounting component 4200 in place on the rear surface 4101 of the article 4100. In an alternative embodiment, the mounting component 4200 may include a plate portion like the plate portion 4310 so that the mounting component 4200 can be directly coupled to the article 4100 with fasteners, and in such embodiments the attachment bracket(s) 4300 may be omitted.

As used throughout, ranges are used as shorthand for describing each and every value that is within the range. Any value within the range can be selected as the terminus of the range. In addition, all references cited herein are hereby incorporated by reference in their entireties. In the event of a conflict in a definition in the present disclosure and that of a cited reference, the present disclosure controls.

While the invention has been described with respect to specific examples including presently preferred modes of carrying out the invention, those skilled in the art will appreciate that there are numerous variations and permutations of the above described systems and techniques. It is to be understood that other embodiments may be utilized and structural and functional modifications may be made without departing from the scope of the present invention. Thus, the spirit and scope of the invention should be construed broadly as set forth in the appended claims.

What is claimed is:

1. A wall mounting apparatus comprising:
   an article comprising a rear surface having a recess defined by a floor and a sidewall that extends from the floor to the rear surface;
   a mounting component comprising a front surface having a mounting channel, a rear surface, and a peripheral surface extending between the front and rear surfaces; and
   a mounting bracket configured to be mounted to a wall;
   wherein the mounting component is positioned in the recess of the article with the rear surface of the mounting component facing the floor of the recess, and wherein the mounting component is bonded to the article with a bonding agent disposed between the peripheral surface of the mounting component and the sidewall of the recess of the article; and
   wherein the article is configured to be mounted to the wall via sliding engagement between the article and the mounting bracket while the mounting bracket is mounted to the wall and at least partially located within the mounting channel of the mounting component.

2. The wall mounting apparatus according to claim 1 wherein the article is formed from a brittle material.

3. The wall mounting apparatus according to claim 1 wherein there is no bonding agent between the rear surface of the mounting component and the floor of the recess of the article.

4. The wall mounting apparatus according to claim 1 wherein the mounting channel comprises a longitudinal axis, wherein the mounting channel is bounded by a sidewall, a first portion of the sidewall of the mounting channel located on a first side of the longitudinal axis and a second portion of the sidewall of the mounting channel located on a second side of the longitudinal axis, the first and second portions of the sidewall of the mounting channel being angled inwardly towards the longitudinal axis in a direction from the rear surface of the mounting component towards the front surface of the mounting component.

5. The wall mounting apparatus according to claim 4 wherein the mounting bracket comprises a first engagement surface that is configured to mate with the first portion of the sidewall of the mounting channel of the mounting component and a second engagement surface that is configured to mate with the second portion of the sidewall of the mounting channel of the mounting component to couple the mounting component to the mounting bracket and prevent movement of the article in a direction perpendicular to the longitudinal axis without first sliding the article relative to the mounting bracket to disengage the first and second engagement surfaces of the mounting bracket from the first and second portions of the sidewall of the mounting channel of the mounting component.

6. The wall mounting apparatus according to claim 5 wherein the mounting bracket comprises a longitudinal axis, a rear surface that is configured to face the wall when the mounting bracket is mounted to the wall, and a front surface opposite the rear surface of the mounting bracket, and wherein the first and second engagement surfaces are angled inwardly towards the longitudinal axis in a direction from the front surface of the mounting bracket towards the rear surface of the mounting bracket.

7. The wall mounting apparatus according to claim 6 wherein the first and second portions of the sidewall of the mounting channel of the mounting component are angled towards the longitudinal axis in a direction from a bottom end of the mounting component to a top end of the mounting component, and wherein the first and second engagement surfaces of the mounting bracket are angled so as to converge towards one another in a direction from a bottom end of the mounting bracket to a top end of the mounting bracket.

8. The wall mounting apparatus according to claim 1 wherein the mounting bracket comprises a bottom surface, a top surface, a longitudinal axis extending between the bottom and top surfaces, a rear surface that faces the wall when the mounting bracket is mounted to the wall, a front surface opposite the rear surface of the mounting bracket, and first and second engagement surfaces that are configured to mate with the mounting component when the mounting component is coupled to the mounting bracket, the first and second engagement surfaces being angled inwardly towards the longitudinal axis in a direction from the front surface of the mounting bracket towards the rear surface of the mounting bracket and wherein the first and second engagement surfaces are angled towards the longitudinal axis in a direction from the bottom surface of the mounting bracket towards the top surface of the mounting bracket.

9. The wall mounting apparatus according to claim 1 wherein the peripheral surface of the mounting component is beveled.

10. The wall mounting apparatus according to claim 1 further comprising:
the mounting channel comprises a longitudinal axis, the mounting channel being bounded by a sidewall having a first portion located on a first side of the longitudinal axis and a second portion located on a second side of the longitudinal axis, the mounting channel comprising an insertion region and a nesting region, and wherein along the nesting region the first and second portions of the sidewall are canted, and wherein within the nesting region the first portion of the sidewall comprises a first notch and the second portion of the sidewall comprises a second notch;
the mounting bracket comprising a first side edge and a second side edge that are canted, a first tab protruding from the first side edge and a second tab protruding from the second side edge; and
wherein when the mounting bracket nests within the nesting region of the mounting channel of the mounting component, the first side edge of the mounting bracket abuts the first portion of the sidewall of the mounting channel and the first tab nests within the first notch and the second side edge of the mounting bracket abuts the second portion of the sidewall of the mounting channel and the second tab nests within the second notch.

11. The wall mounting apparatus according to claim 10 further comprising:
the sidewall of the mounting component comprising a top portion that forms a top boundary of the mounting channel, a third notch being formed into the top portion of the sidewall of the mounting component;
the mounting bracket comprising a top edge, a third tab protruding from the top edge; and
wherein when the mounting bracket nests within the nesting region of the mounting channel of the mounting component, the top edge of the mounting bracket abuts the top portion of the sidewall of the mounting component and the third tab nests within the third notch.

12. A wall mounting apparatus comprising:
a wall-mountable assembly comprising:
an article formed from a brittle material and comprising a rear surface having a recess defined by a floor and a sidewall that extends from the floor to the rear surface;
a mounting component formed from a metal or a plastic and comprising a front surface having a mounting channel, a rear surface, and a peripheral surface extending between the front and rear surfaces, wherein the mounting component is positioned within the recess of the article so that the rear surface of the mounting component abuts the floor of the recess of the article and a gap exists between the peripheral surface of the mounting component and the sidewall of the recess of the article; and
a bonding agent disposed within the gap and bonded to at least one of the peripheral surface of the mounting component and the sidewall of the recess of the article to fixedly couple the mounting component to the article;
a mounting bracket configured to be mounted to a wall; and
wherein the wall-mountable assembly is mounted to the mounting bracket via sliding engagement between the mounting component and the mounting bracket while the mounting bracket is at least partially located within the mounting channel of the mounting component.

13. The wall mounting apparatus according to claim 1 wherein the article is formed from a solid surface material, and wherein the mounting component and the mounting bracket are formed from plastic or metal.

14. The wall mounting apparatus according to claim 1 wherein the bonding agent bonds to at least one of the sidewall of the recess of the article and the peripheral surface of the mounting component.

15. The wall mounting apparatus according to claim 1 wherein at least a portion of the peripheral surface of the mounting component is spaced apart from the sidewall of the recess by an annular gap that is filled with the bonding agent.

16. The wall mounting apparatus according to claim 1 wherein the mounting bracket comprises a front surface, a rear surface opposite the front surface of the mounting bracket, and a through-hole extending from the front surface of the mounting bracket to the rear surface of the mounting bracket, the through-hole configured to receive a fastener to mount the mounting bracket to the wall.

17. The wall mounting apparatus according to claim 1 wherein the article is a shelf or a ledge.

18. The wall mounting apparatus according to claim 12 wherein the bonding agent is an epoxy adhesive comprising a resin and a hardener and wherein the brittle material is solid surface.

19. The wall mounting apparatus according to claim 12 wherein the mounting component comprises a flange having a rear surface that abuts the floor of the recess of the article and a front surface opposite the rear surface of the flange, the front surface of the flange being recessed relative to the rear surface of the article by the gap which extends from the front surface of the flange to the rear surface of the article.

20. The wall mounting apparatus according to claim 19 wherein the bonding agent is in contact with each of the sidewall of the recess of the article, the peripheral surface of the mounting component, and the front surface of the flange of the mounting component.

\* \* \* \* \*